US011245831B2

(12) United States Patent
Bunn et al.

(10) Patent No.: US 11,245,831 B2
(45) Date of Patent: Feb. 8, 2022

(54) WIRELESS CAMERA SYSTEM

(71) Applicant: R.F. Wireless Systems Inc., Burlington (CA)

(72) Inventors: Robert Douglas Bunn, Newmarket (CA); Benjamin Boriss, Markdale (CA); Ralph Grohmann, Ancaster (CA); Brooke Eady-Lapsley, Burlington (CA); Locke Niel Norman Eady, Burlington (CA); Shea Marshall Cole Eady, Ancaster (CA)

(73) Assignee: R.F. Wireless Systems Inc., Burlington (CA)

( * ) Notice: Subject to any disclaimer, the term of this patent is extended or adjusted under 35 U.S.C. 154(b) by 0 days.

(21) Appl. No.: 17/277,830

(22) PCT Filed: Sep. 23, 2019

(86) PCT No.: PCT/CA2019/051353
§ 371 (c)(1),
(2) Date: Mar. 19, 2021

(87) PCT Pub. No.: WO2020/056526
PCT Pub. Date: Mar. 26, 2020

(65) Prior Publication Data
US 2021/0314479 A1 Oct. 7, 2021

Related U.S. Application Data

(60) Provisional application No. 62/734,634, filed on Sep. 21, 2018.

(51) Int. Cl.
*H04W 80/02* (2009.01)
*H04B 1/40* (2015.01)
(Continued)

(52) U.S. Cl.
CPC ........ *H04N 5/23203* (2013.01); *A42B 3/042* (2013.01); *H04B 1/034* (2013.01);
(Continued)

(58) Field of Classification Search
None
See application file for complete search history.

(56) References Cited

U.S. PATENT DOCUMENTS 5,323,203 A 6/1994 Maruyama et al.
6,819,354 B1 11/2004 Foster et al.
(Continued)

FOREIGN PATENT DOCUMENTS

WO 2017040724 A1 3/2017

*Primary Examiner* — Pablo N Tran
(74) *Attorney, Agent, or Firm* — Patrick J. Hofbauer

(57) ABSTRACT

A system for providing controls signals to a wireless remote camera comprises a signal generating device that presents forward and inverse polarity pulse trains. A transmitter data converter circuit has a forward polarity input point for receiving the inverse polarity pulse trains and an inverse polarity input point for receiving the forward polarity pulse trains, and converts the forward and inverse polarity pulse trains to a conditioned unitary pulse train. A modulator circuit modulates the conditioned unitary pulse train onto an RF carrier. A demodulator circuit demodulates the modulated output wave to produce a reproduction of the conditioned unitary pulse train. A receiver data converter circuit converts the conditioned unitary pulse train to conditioned forward polarity pulse trains and conditioned inverse polarity pulse trains. A camera control circuit produces control signals based on the conditioned forward and inverse polarity pulse trains. A wireless remote camera receives the control signals.

17 Claims, 18 Drawing Sheets

(51) Int. Cl.
*H04W 4/30* (2018.01)
*H04L 12/40* (2006.01)
*H04N 5/232* (2006.01)
*H04N 5/225* (2006.01)
*A42B 3/04* (2006.01)
*H04B 1/034* (2006.01)
*H04B 1/04* (2006.01)
*H04B 1/06* (2006.01)

(52) U.S. Cl.
CPC ............... *H04B 1/04* (2013.01); *H04B 1/06* (2013.01); *H04B 1/40* (2013.01); *H04N 5/2253* (2013.01); *H04N 5/2257* (2013.01)

(56) References Cited

U.S. PATENT DOCUMENTS

| | | | |
|---|---|---|---|
| 7,555,369 B2* | 6/2009 | Pillar | B65F 3/045 701/1 |
| 8,131,859 B2* | 3/2012 | Fujii | H04W 48/16 709/228 |
| 8,250,218 B2* | 8/2012 | Watanabe | H04L 67/14 709/227 |
| 9,499,128 B2* | 11/2016 | Reh | G06Q 10/02 |
| 10,616,534 B2* | 4/2020 | Thiel | A41D 13/0012 |
| 2009/0018419 A1* | 1/2009 | Torch | G06F 3/013 600/318 |
| 2014/0362244 A1 | 12/2014 | Martin | |
| 2015/0271367 A1 | 9/2015 | Musec et al. | |
| 2016/0241794 A1* | 8/2016 | Lee | H04N 5/262 |

* cited by examiner

WIRELESS CAMERA SYSTEM

FIELD OF THE INVENTION

The present invention relates to the remote control of mobile video cameras, and more particularly to the wireless remote control of mobile remotely controlled video cameras.

BACKGROUND AND SUMMARY OF THE INVENTION

In many events such as sports, mobile remotely controlled video cameras are mounted on players, officials, participants, equipment used by players and/or officials and/or participants, and so on. These mobile remotely controlled video cameras are typically referred to as wearable/mountable cameras. In order for these wearable/mountable cameras to be used in live, line-cut broadcast workflow, the video engineer needs to have control of the image setting at all times. This is required so the video engineer can closely match the video image to the other broadcast cameras being used at the same live broadcast event.

In prior art wearable/mountable camera solutions, the video engineer in the broadcast facility did not have real time control of the video setting of the wearable/mountable camera at the board level. This is a significant workflow issue for live use of this resource. Other problems include the capacity of the battery powering the wearable/mountable camera was not maximized to meet the needs of a typical live event; such as a hockey, baseball, football game of roughly 3 to 4 hours. This required a battery change midway through an event, which interrupts the wearer's regular workflow.

While the Dragonfly™ Encoder/Transmitter presently used in the industry as a solution for video transport from a wearable/mountable camera, it lacks various feature sets to control the camera connected to it. For example:

1. The Dragonfly™'s use of Marshall™'s on-Screen menu system for video control interrupts the production group's live use of this camera (which results in the camera not being adjustable while transmitting real time images);
2. Local, short range Wi-Fi connection needed to achieve limited video control through browser based GUI, which does not provide the range, interface, or real-time control to use this camera in typical live event coverage;
3. Dragonfly™ Transmitter does not support an RCP (Remote Control Panel); and,
4. Marshall™ wearable/mountable camera supports an RCP, but only in a wired (connected) configuration.

Therefore, a lightweight wireless solution needed to be developed to create optimum workflow for the Video Engineer, Production group and RF Technician, which wireless solution meets the three most important needs encountered with the use of a wearable mobile remote camera system, namely size and/or weight, battery life, and the need for the video signal from the remote camera to be uninterrupted in order to control the camera. Developing a small lightweight system with sufficient battery life, and with full functionality was very difficult. Further, it would be unacceptable in professional broadcast video transmission to interrupt the video signal feed from the remote camera in order to control the camera; however, it would readily be believed by those skilled in the art that it would be necessary to use sophisticated highly functional complicated circuit components such as microprocessors, UARTS, and so on, to develop a system for providing controls signals to a remote camera that meets the above-stated requirements, and that fully meets the objects set forth below, which objects are not met by the prior art.

Further, there needed to be developed a system for providing controls signals to a wireless remote camera, which system meets the following objects.

It is an object of the present invention to provide a system for providing controls signals to a wireless remote camera system.

It is an object of the present invention to provide a system for providing controls signals to a wireless mobile remote camera system via radio frequency (RF) transmission.

It is an object of the present invention to provide a system for providing controls signals to a wireless mobile remote camera system via radio frequency (RF) transmission.

It is an object of the present invention to provide a system for providing controls signals to a wireless mobile remote camera system wherein the video cameras are mounted on players, officials, participants, equipment used by players and/or officials and/or participants, and so on.

It is an object of the present invention to provide a system for providing controls signals to a wireless remote camera system used in live, line-cut broadcast workflow.

It is an object of the present invention to provide a system for providing controls signals to a wireless remote camera system, wherein the video engineer in the broadcast facility has control of the image settings of the remote camera at all times.

It is an object of the present invention to provide a system for providing controls signals to a wireless remote camera system, wherein the video engineer in the broadcast facility has real time control of the video settings of the remote camera.

It is an object of the present invention to provide a system for providing controls signals to a wireless remote camera system, wherein the video signal feed from the remote camera does not need to be interrupted in order to control the camera, thereby allowing for adjustment of the remote camera settings in real time while it is transmitting images.

It is an object of the present invention to provide a system for providing controls signals to a wireless remote camera system, wherein the system does not cause significant workflow issues.

It is an object of the present invention to provide a system for providing controls signals to a wireless remote camera, wherein the system is of a small size.

It is an object of the present invention to provide a system for providing controls signals to a wireless remote camera, wherein the system is lightweight.

The closest known prior art will now be discussed.

U.S. Pat. No. 6,819,354, issued Nov. 16, 2004, to Foster et al, and entitled Completely Integrated Helmet Camera, discloses a camera unit mountable to a helmet. The camera unit includes a single-chip image sensor and an attaching unit for attaching the camera unit to an existing structure of a helmet, a transmit unit for transmitting of video signals and a receive unit for receiving control signals that control parameters associated with the camera unit. The control signals can be sent from a remote unit, thereby allowing the remote unit to control parameters of the camera unit, such as exposure, gain, white balance, color saturation, brightness, or hue. The camera unit can be of a small size and weight, and can be completely integrated on a single-chip, thereby minimizing intrusiveness to the helmet wearer. The specific technology used to achieve a lightweight device is not discussed in the Foster et al patent document. Also, the issue of the need for the video signal from the remote camera to be uninterrupted in order to control the camera is not discussed.

United States Published Patent Application No. 20140270687 A1, published Sep. 18, 2014, to Jannard et al, and entitled Digital Camera With Wireless Connectivity, and U.S. patent Ser. No. 10/271,031 B2, issued Apr. 23, 2019, to Jannard et al, and entitled Broadcast Module For A Digital Camera, each disclose a modular digital camera system, relating to both digital still and motion cameras. The modules may be used to add wireless capabilities employing standard wireless protocols to allow a variety of devices to control or communicate with the modular digital camera system. The system has a remote control port, such as an RS232 control port, which system can be used to permit control of various functions of the camera. The Jannard et al document discusses various capabilities of the overall system, but does not solve the issues of size and/or weight, battery life, and the need for the video signal from the remote camera to be uninterrupted in order to control the camera. Further, the Jannard et al does not discuss the installation of the camera system on a helmet or even on a wearer's body.

The present invention provides a novel system for providing controls signals to a wireless remote camera. The system comprises a signal generating device having a forward polarity output point for presenting forward polarity pulse trains and an inverse polarity output point for presenting inverse polarity pulse trains that are the inverse of the forward polarity pulse trains. The pulse trains are compatible with a pre-defined electronic data transmission standard. A transmitter data converter circuit has a forward polarity input point for receiving the inverse polarity pulse trains and an inverse polarity input point for receiving the forward polarity pulse trains, and also has circuitry for converting the forward polarity pulse trains and the inverse polarity pulse trains to a conditioned unitary pulse train, and a single point output for presenting the conditioned unitary pulse train. A modulator circuit has an input for receiving the conditioned unitary pulse train, circuitry for modulating the conditioned unitary pulse train onto a radio frequency (RF) carrier to thereby produce a modulated output wave, and a radio frequency (RF) output for transmitting the modulated output wave. A demodulator circuit has a radio frequency (RF) input for receiving the modulated output wave, circuitry for demodulating the modulated output wave to thereby produce a reproduction of the conditioned unitary pulse train, and an output for presenting the reproduction of the conditioned unitary pulse train. A receiver data converter circuit has a single point output for receiving the conditioned unitary pulse train, circuitry for converting the conditioned unitary pulse train to conditioned forward polarity pulse trains and conditioned inverse polarity pulse trains that are the inverse of the conditioned forward polarity pulse trains, and a forward polarity input point for presenting the inverse polarity pulse trains and an inverse polarity input point for presenting the forward polarity pulse trains. A camera control circuit has an input port comprising a forward polarity input point for receiving the conditioned forward polarity pulse trains from the inverse polarity input point of the receiver data converter circuit and an inverse polarity input point for receiving the conditioned inverse polarity pulse trains from the forward polarity input point of the receiver data converter circuit, and circuitry for producing control signals based on the conditioned forward polarity pulse trains and the conditioned inverse polarity pulse trains. A camera is connected in signal receiving to the camera control circuit for receiving control signals therefrom.

The present invention provides novel circuitry for providing controls signals to a wireless remote camera. The circuitry comprises a transmitter data converter circuit having a forward polarity input point for receiving inverse polarity pulse trains and an inverse polarity input point for receiving forward polarity pulse trains, and having circuitry for converting the forward polarity pulse trains and the inverse polarity pulse trains to a conditioned unitary pulse train, and a single point output for presenting the conditioned unitary pulse train. A modulator circuit has an input for receiving the conditioned unitary pulse train, circuitry for modulating the conditioned unitary pulse train onto a radio frequency (RF) carrier to thereby produce a modulated output wave, and a radio frequency (RF) output for transmitting the modulated output wave. A demodulator circuit has a radio frequency (RF) input for receiving the modulated output wave, circuitry for demodulating the modulated output wave to thereby produce a reproduction of the conditioned unitary pulse train, and an output for presenting the reproduction of the conditioned unitary pulse train. A receiver data converter circuit has a single point output for receiving the conditioned unitary pulse train, circuitry for converting the conditioned unitary pulse train to conditioned forward polarity pulse trains and conditioned inverse polarity pulse trains that are the inverse of the conditioned forward polarity pulse trains, and a forward polarity input point for presenting the inverse polarity pulse trains and an inverse polarity input point for presenting the forward polarity pulse trains. A camera control circuit has an input port comprising a forward polarity input point for receiving the conditioned forward polarity pulse trains from the inverse polarity input point of the receiver data converter circuit and an inverse polarity input point for receiving the conditioned inverse polarity pulse trains from the forward polarity input point of the receiver data converter circuit, and circuitry for producing control signals based on the conditioned forward polarity pulse trains and the conditioned inverse polarity pulse trains.

The present invention provides a novel method of providing controls signals to a wireless remote camera. The method comprises the steps of a) producing forward polarity pulse trains and inverse polarity pulse trains that are the inverse of the forward polarity pulse trains, and that are each compatible with a pre-defined electronic data transmission standard; b) presenting the forward polarity pulse trains from a forward polarity output point and the inverse polarity pulse trains from an inverse polarity output point; c) receiving the inverse polarity pulse trains into a forward polarity input point of a transmitter data converter circuit and the forward polarity pulse trains into an inverse polarity input point of the transmitter data converter circuit; d) converting the forward polarity pulse trains and the inverse polarity pulse trains to a conditioned unitary pulse train; e) modulating the conditioned unitary pulse train onto a radio frequency (RF) carrier to thereby produce a modulated output wave; f) demodulating the modulated output wave to thereby produce a reproduction of the conditioned unitary pulse train; g) converting the conditioned unitary pulse train to conditioned forward polarity pulse trains and conditioned inverse polarity pulse trains that are the inverse of the conditioned forward polarity pulse trains; h) presenting the inverse polarity pulse trains at a forward polarity input point and the forward polarity pulse trains at an inverse polarity input point; i) receiving the conditioned forward polarity pulse trains into a forward polarity input point of a camera control circuit and the conditioned inverse polarity pulse trains into a inverse polarity input point of the camera control circuit; and j) producing control signals based on the conditioned forward polarity pulse trains and the conditioned inverse polarity pulse trains for use in controlling a camera.

The present invention provides a wearable camera and circuit assembly comprising a helmet, a forward holder mounted on the forward area of the helmet and a rearward holder mounted on the rearward area of the helmet. A wireless camera is mounted on the forward holder. A camera control circuit is mounted on the forward holder. A power supply circuit is mounted on the rearward holder. A battery is mounted on the rearward holder. A data-receiving antenna is mounted on the rearward holder. A power distribution circuit board is mounted on the rearward holder.

The present invention provides a novel wireless camera and circuit assembly comprising a forward holder mountable on the forward area of a helmet and a rearward holder mountable on the rearward area of a helmet. A camera is mounted on the forward holder. A camera control circuit is mounted on the forward holder. A power supply circuit is mounted on the rearward holder. A battery is mounted on the rearward holder. A data-receiving antenna is mounted on the rearward holder. A power distribution circuit board is mounted on the rearward holder.

The above and other objects, advantages, features and characteristics of the present invention, as well as methods of operation and functions of the related elements of the structure, and the combination of parts and economies of manufacture, will become more apparent upon consideration of the following detailed description and the appended claims with reference to the accompanying drawings, the latter of which is briefly described hereinbelow.

BRIEF DESCRIPTION OF THE DRAWINGS

The novel features which are believed to be characteristic of the present invention, as to its structure, organization, use and method of operation, together with further objectives and advantages thereof, will be better understood from the following drawings in which a presently preferred embodiment of the invention will now be illustrated by way of example. It is expressly understood, however, that the drawings are for the purpose of illustration and description only, and are not intended as a definition of the limits of the invention. In the accompanying drawings.

DETAILED DESCRIPTION OF THE EXEMPLARY EMBODIMENTS

Reference will now be made to FIGS. 1 through 16, which show an exemplary embodiment according to the present invention.

Figure 1:
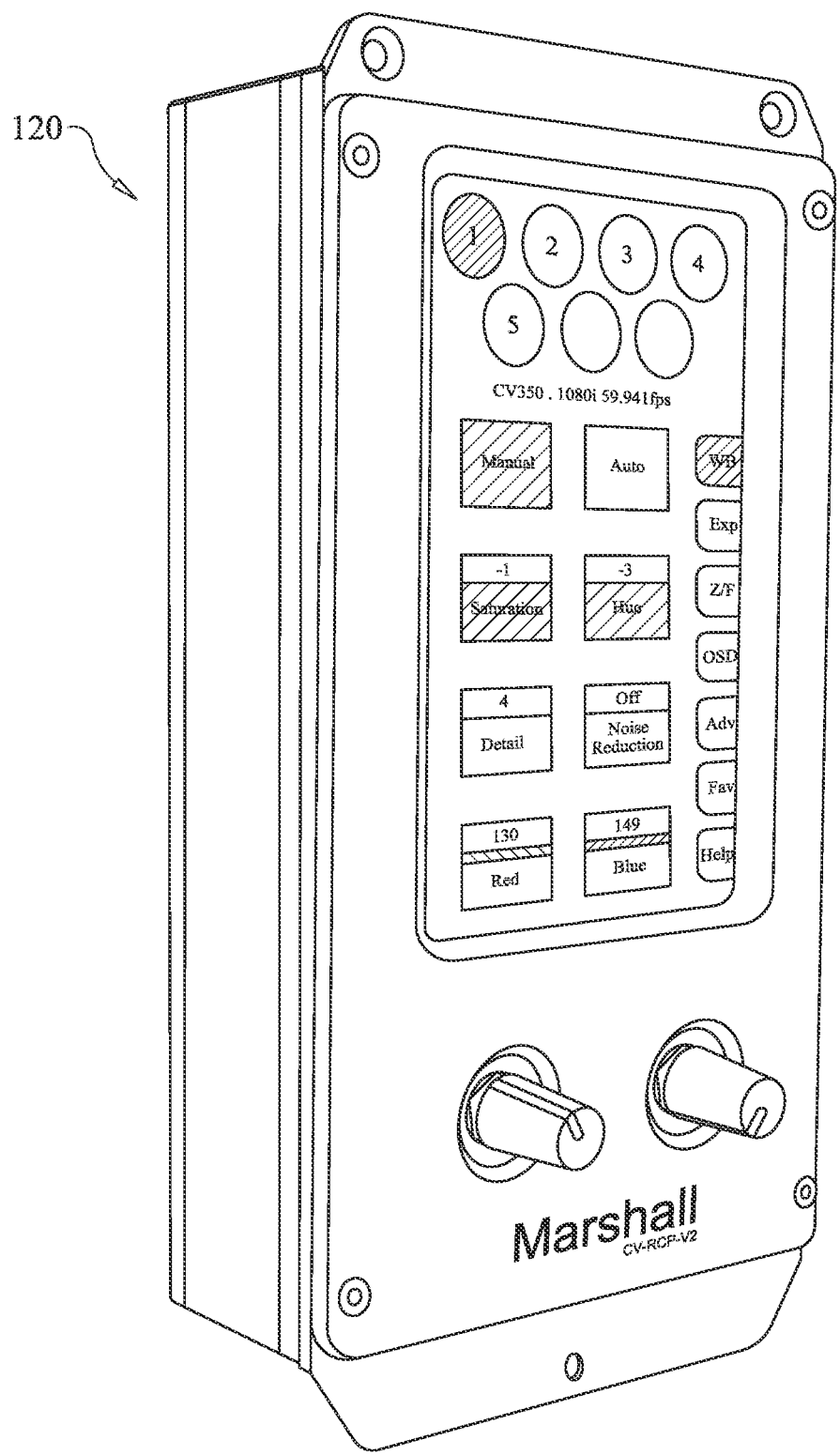
FIG. 1 is a perspective view from the front of the operator's control panel used in the system for providing controls signals to a wireless remote camera according to the present invention.
Figure 2:
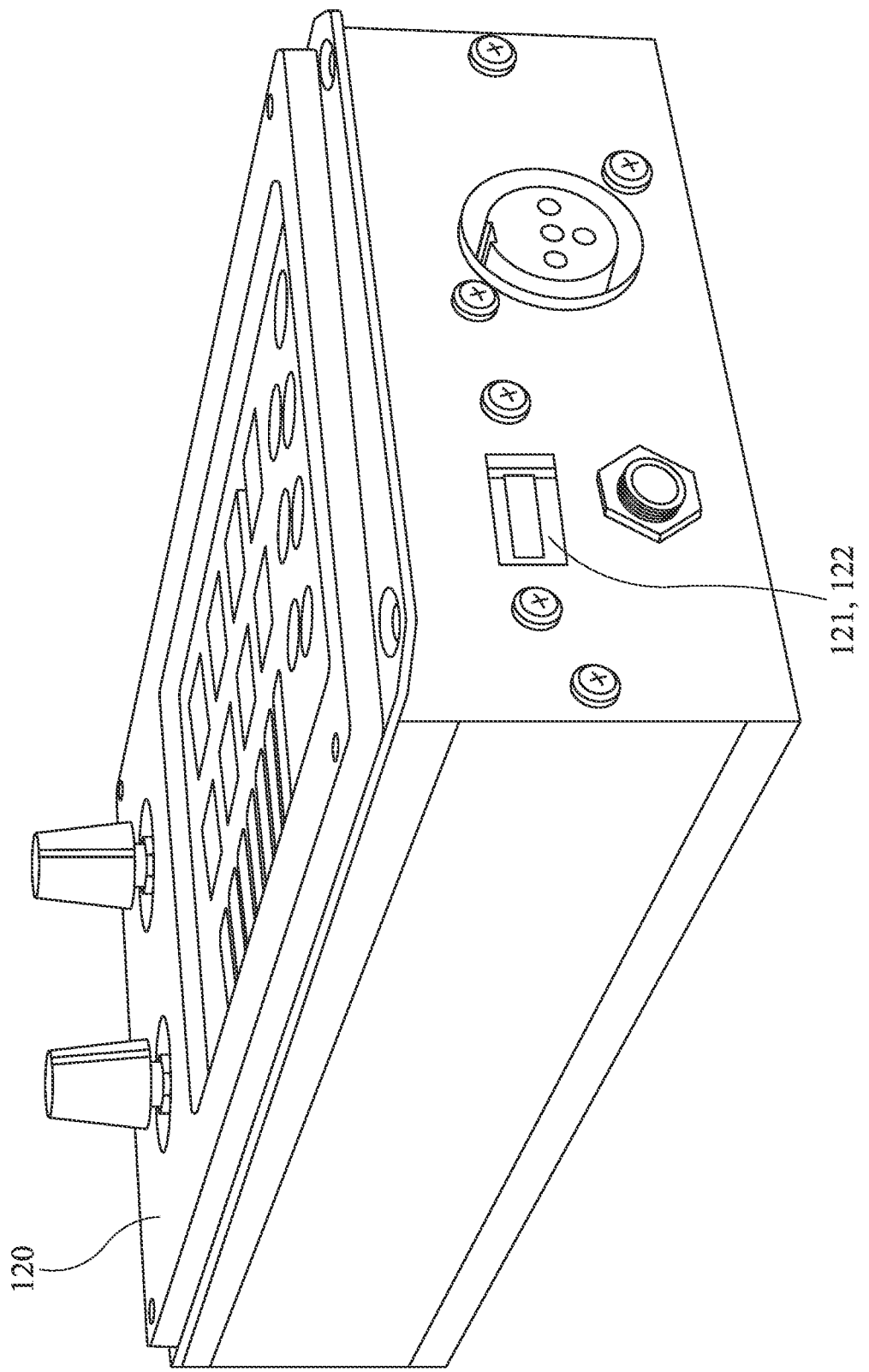
FIG. 2 is a perspective view from the bottom of the operator's control panel of FIG. 1.
Figure 3:
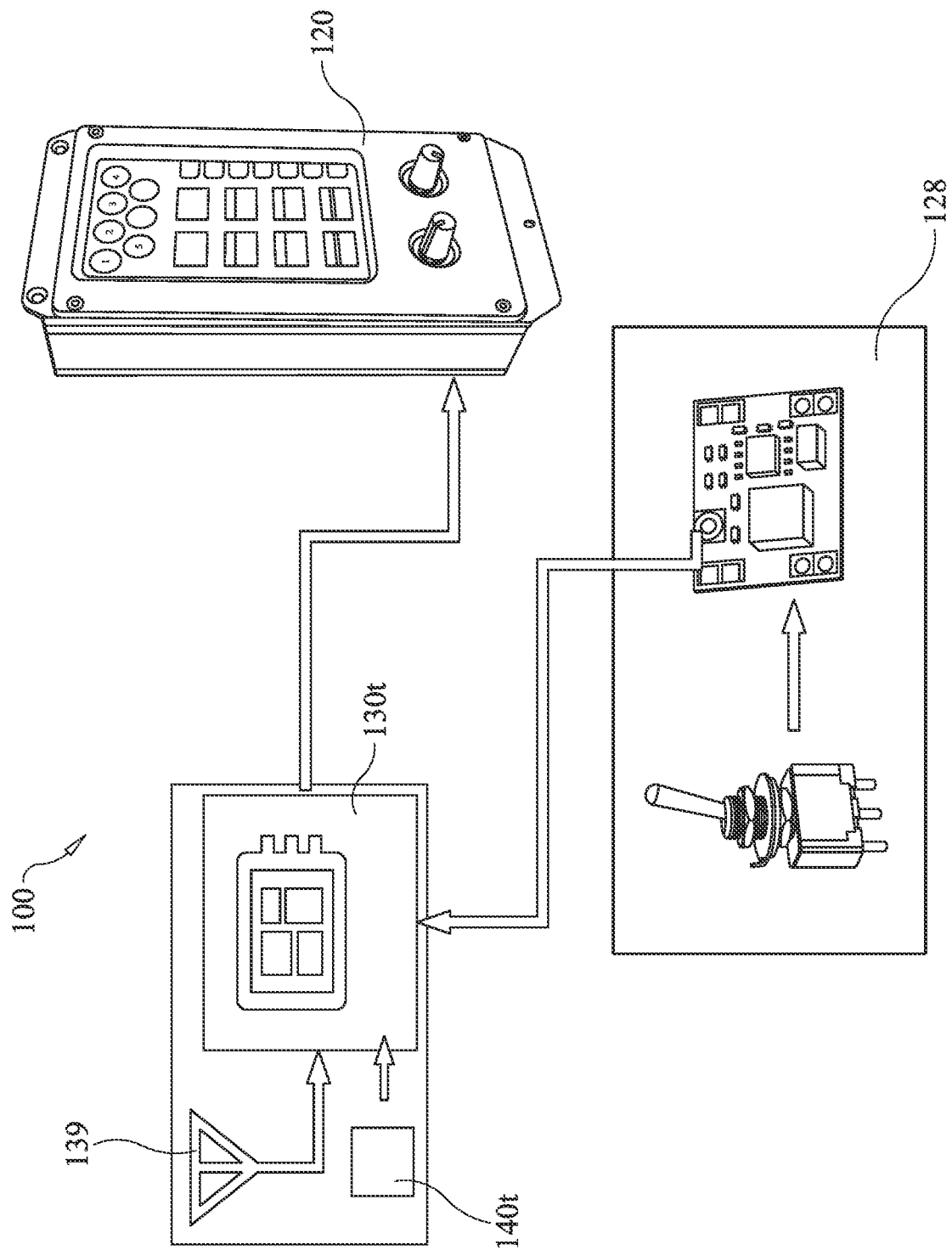
FIG. 3 is a diagrammatic view of the transmitter unit according to the present invention that is located at the video engineer's control panel of FIG. 1, which control panel is used with-in the broadcast facility.
Figure 4:
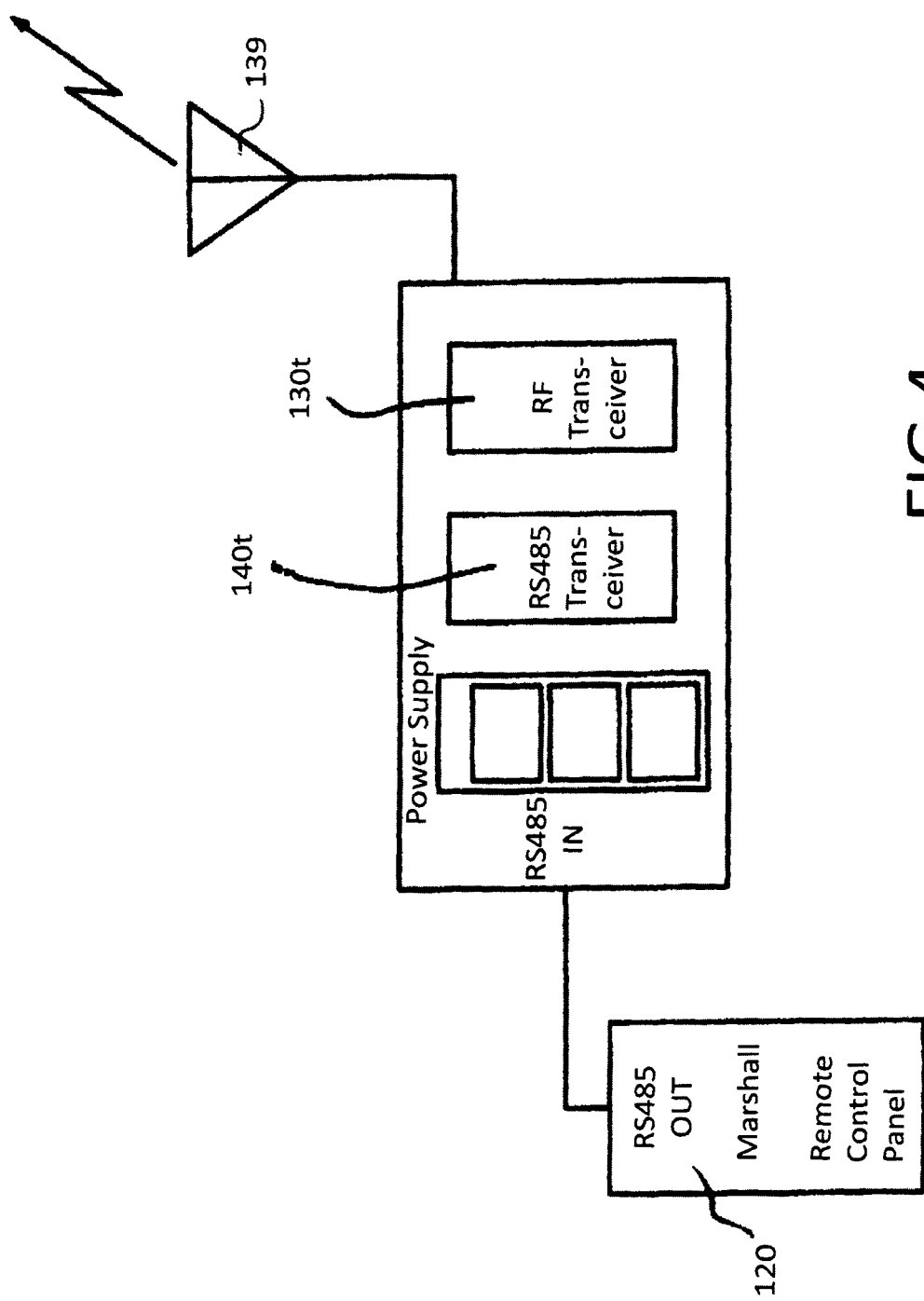
FIG. 4 is a block diagram of the transmitter circuit of the transmitter unit of FIG. 3 connected to the video engineer's control panel of FIG. 1.
Figure 7:
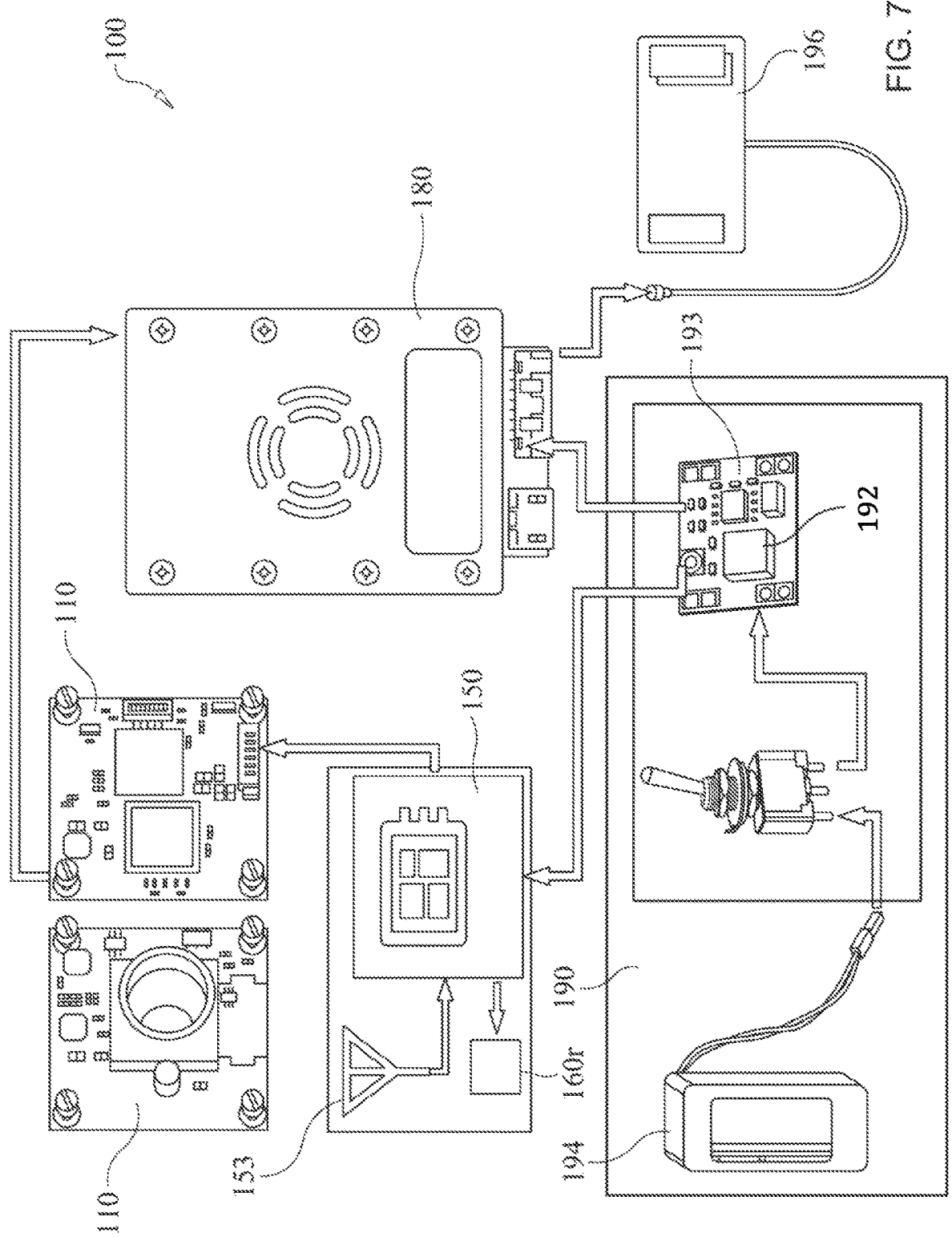
FIG. 7 is a diagrammatic view of the remote receiver unit according to the present invention that is located on a helmet with the mobile remotely controlled video camera.
Figure 8:
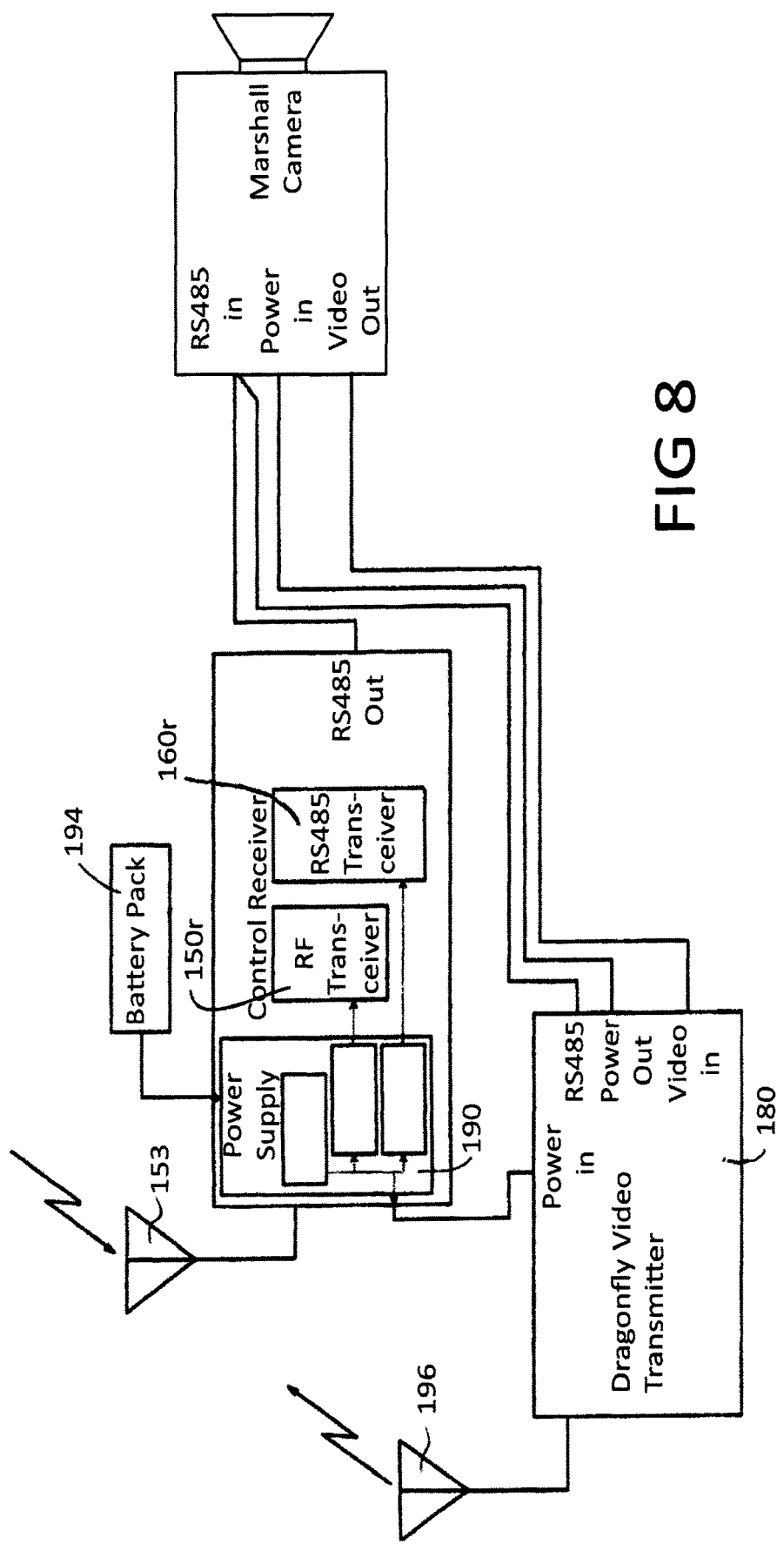
FIG. 8 is a block diagram of the receiver circuit of the receiver unit of FIG. 7 connected to a remote camera of FIG. 7.

The applicant's solution to the aforementioned live event workflow issues is the InCite™ system for providing controls signals to a wireless remote camera, as indicated by the general reference numeral 100 in FIGS. 3 and 7. The camera control system 100 is for controlling various operating characteristics of the wireless video camera 110 mounted on a helmet 102. The wireless video camera 110 shown is a known device made and marketed by Marshall Electronics, Inc. of Torrance, Calif., USA, being preferably a Marshall™ Model V-1292B-2MP (59.94/29.97 fps)|V-1292-2MP (60/50/30/25 fps) 2.5MP Full-HD Color Board Camera).

The camera 110 is controlled using a remote control panel (RCP) 120, such as, preferably, remote control panel model CV-RCP-V2 Multi-Camera Control Touchscreen RCP, which serves as a signal generating device also manufactured and marketed by Marshall Electronics, Inc.

A first Linx™ LT Series transceiver 130$t$ is used for transmitting the control data and a second Linx™ LT Series transceiver 150$r$ is used for receiving the control data due to the transparency of the Linx™ LT Series transceiver with respect to the data being transmitted. The LT Series transceivers 130$t$, 150$r$ have no Universal Asynchronous Receiver-Transmitter) UART. In the described embodiment of the present invention, the first Linx™ LT Series transceiver 130$t$ simply turns on the carrier for a logic "one" and turns off the carrier for a logic "zero".

As best seen in FIG. 3, a Dragonfly™ transmitter 180 mounted on the helmet 102 is used to transmit the video signal from the Marshall™ Camera 110 back to the Marshall™ RCP Remote Control Panel 120.

Figure 5:
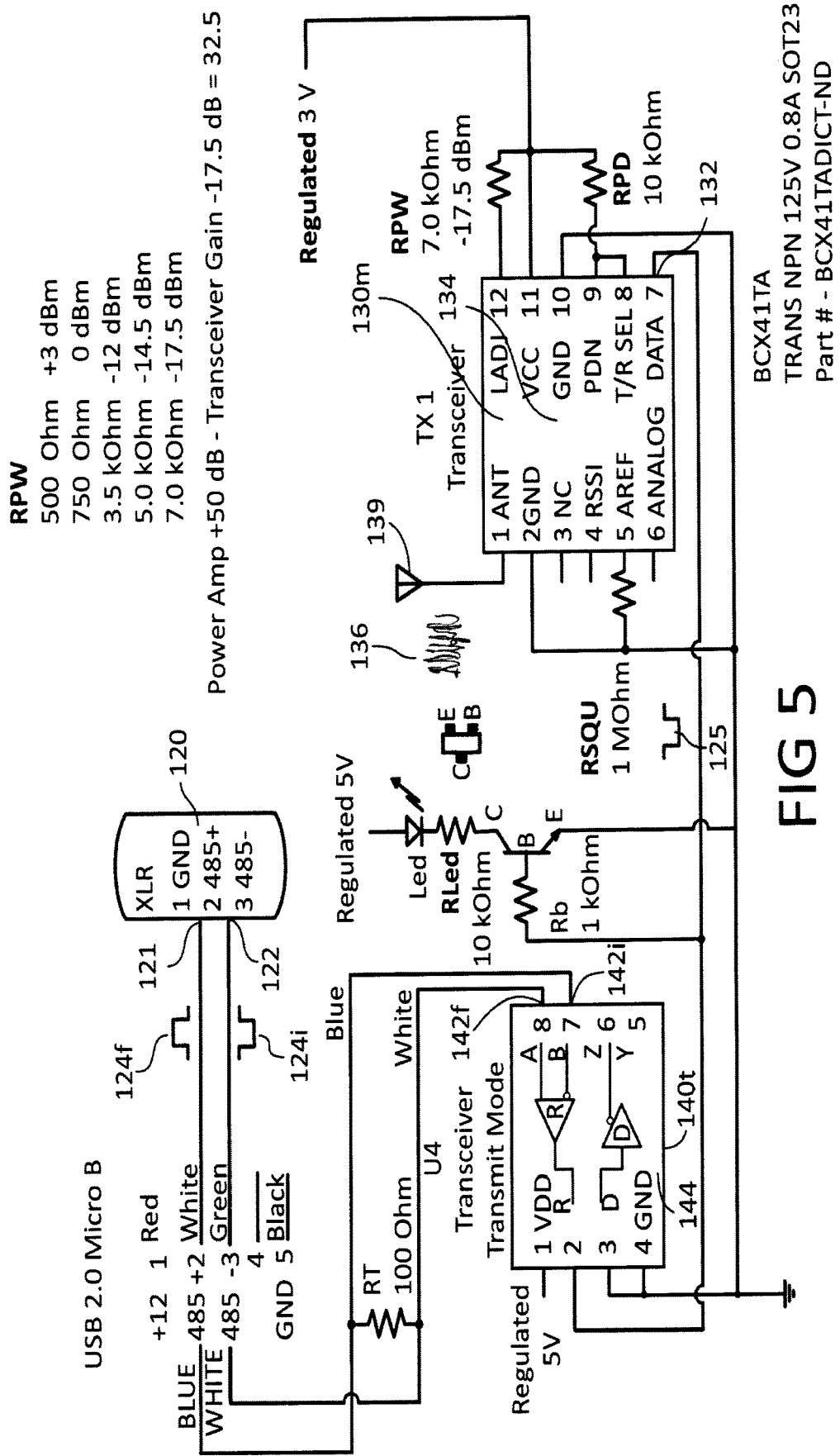
FIG. 5 is a circuit diagram of the transmitter circuit of FIG. 4.
Figure 6:
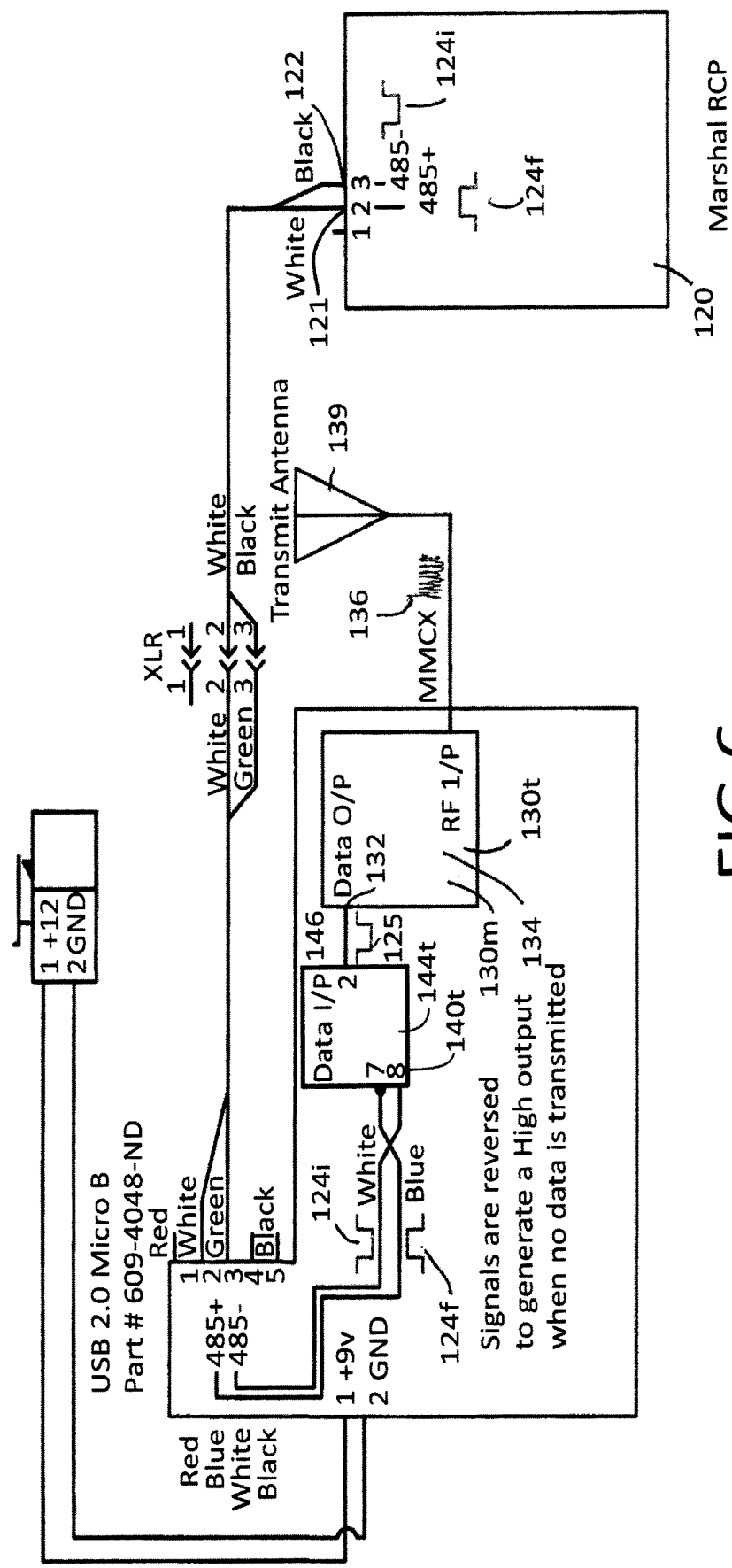
FIG. 6 is a circuit and signal flow diagram of the transmitter circuit and video engineer's control panel of FIG. 1.
Figure 9:
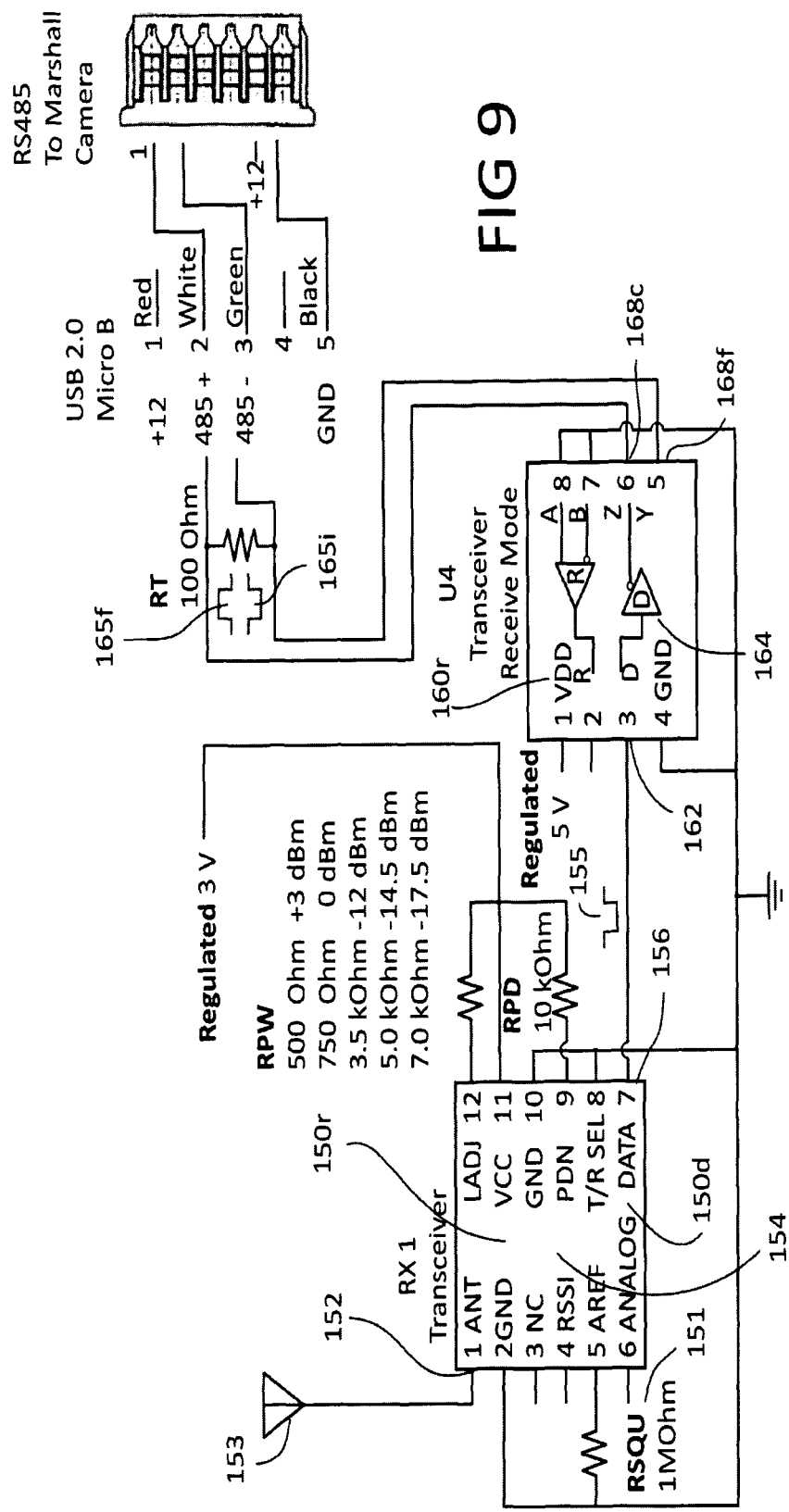
FIG. 9 is a circuit diagram of the transmitter circuit of FIG. 8.
Figure 10:
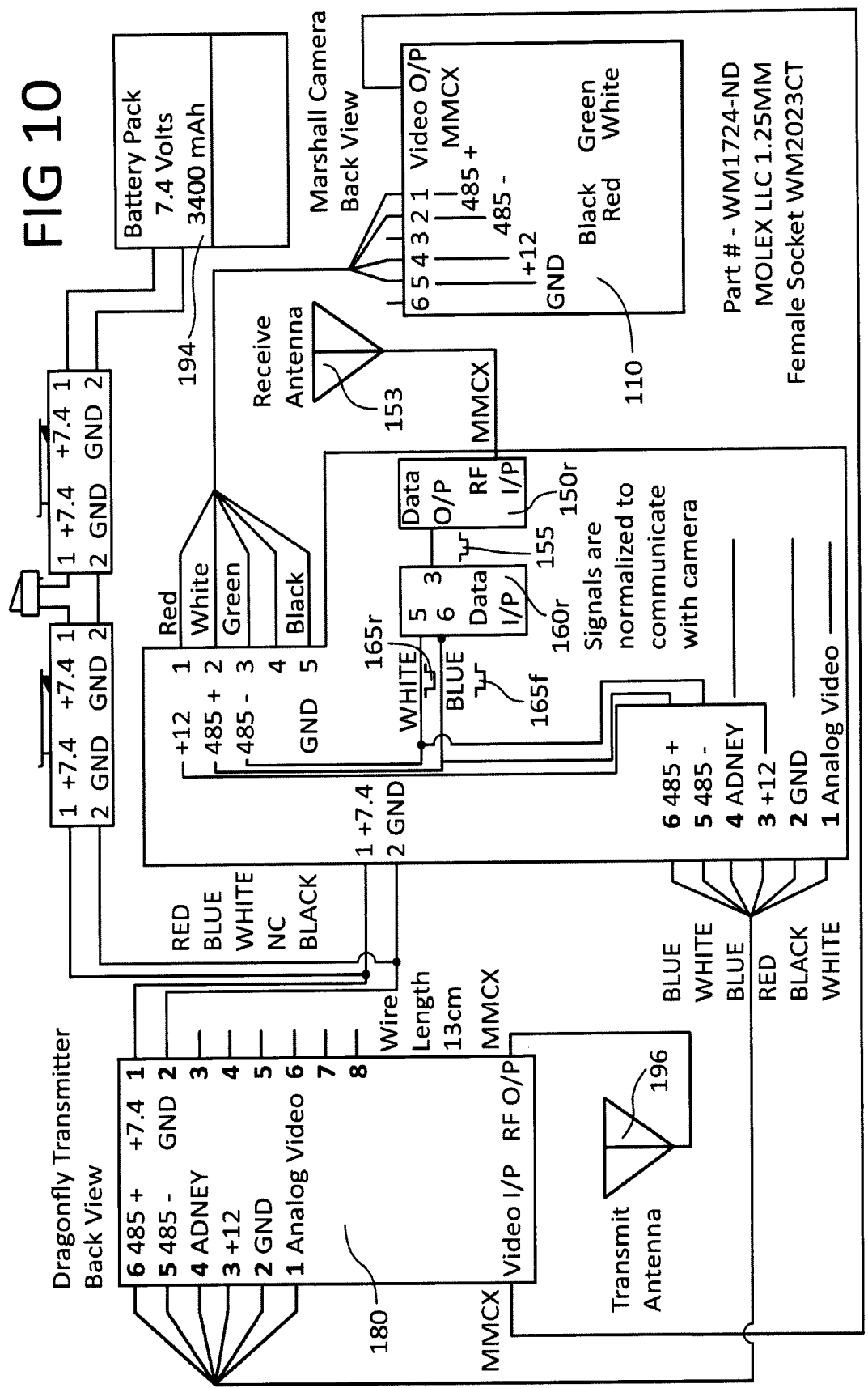
FIG. 10 is a circuit and signal flow diagram of the transmitter circuit of FIG. 8 and remote camera of FIG. 7.
Figure 11A:
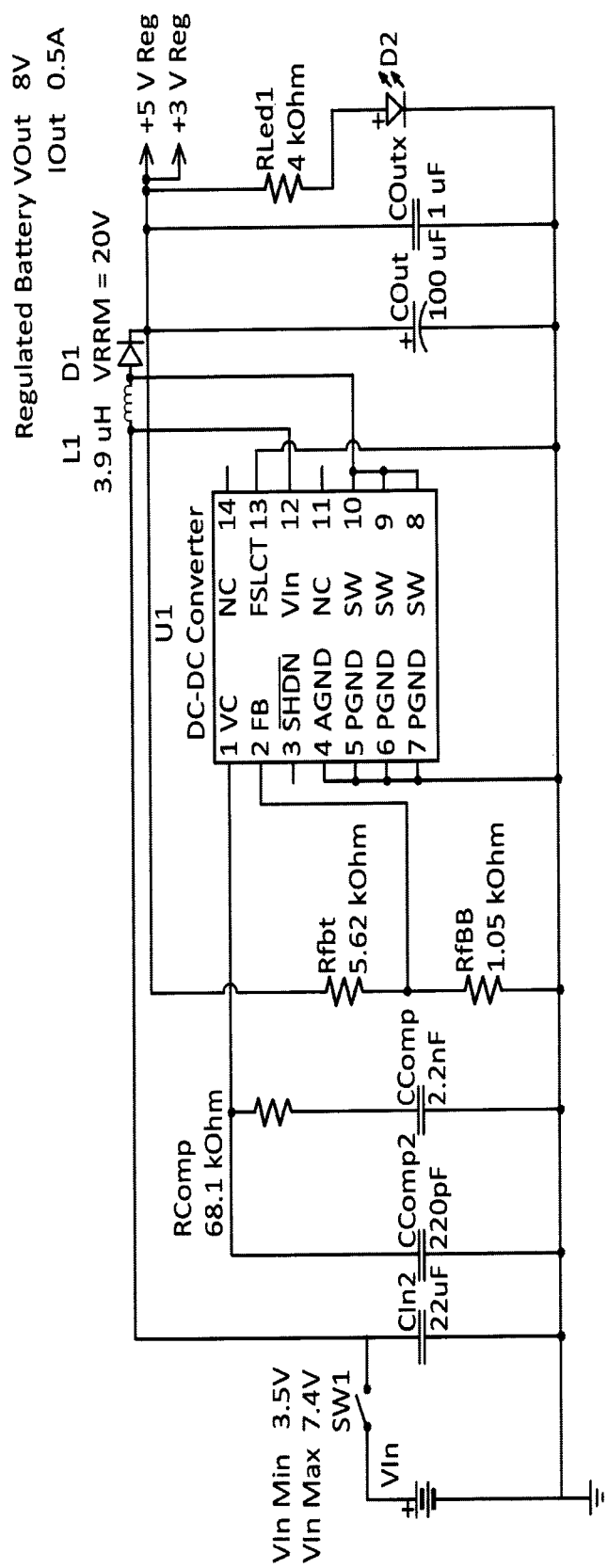
FIGS. 11A, 11B and 11C are block diagrams of the power supply circuit according to the present invention used on the helmets as shown in FIGS. 13 through 15.
Figure 11B:
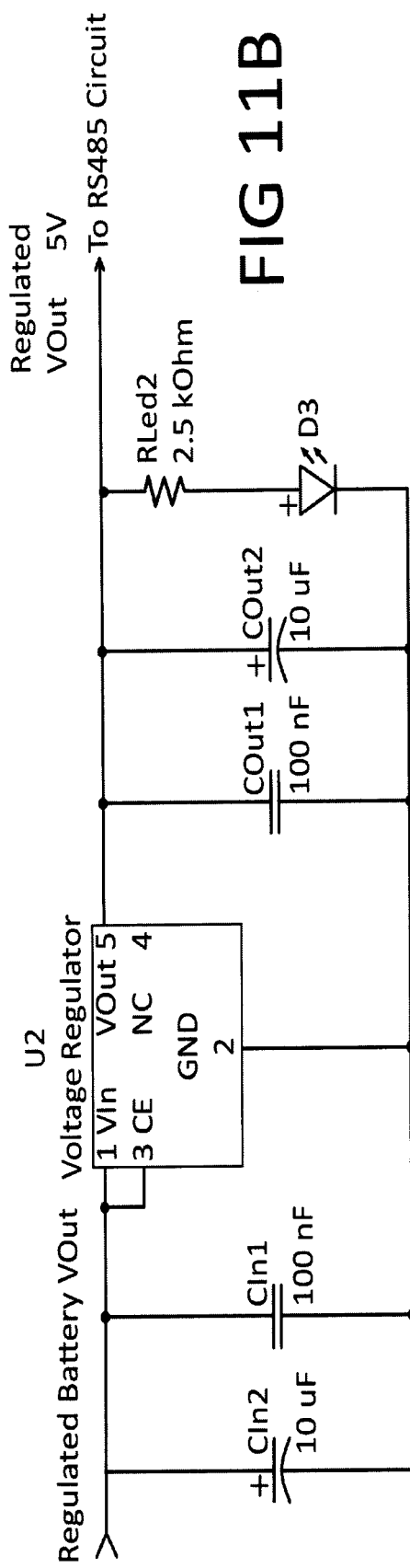
Figure 11C:
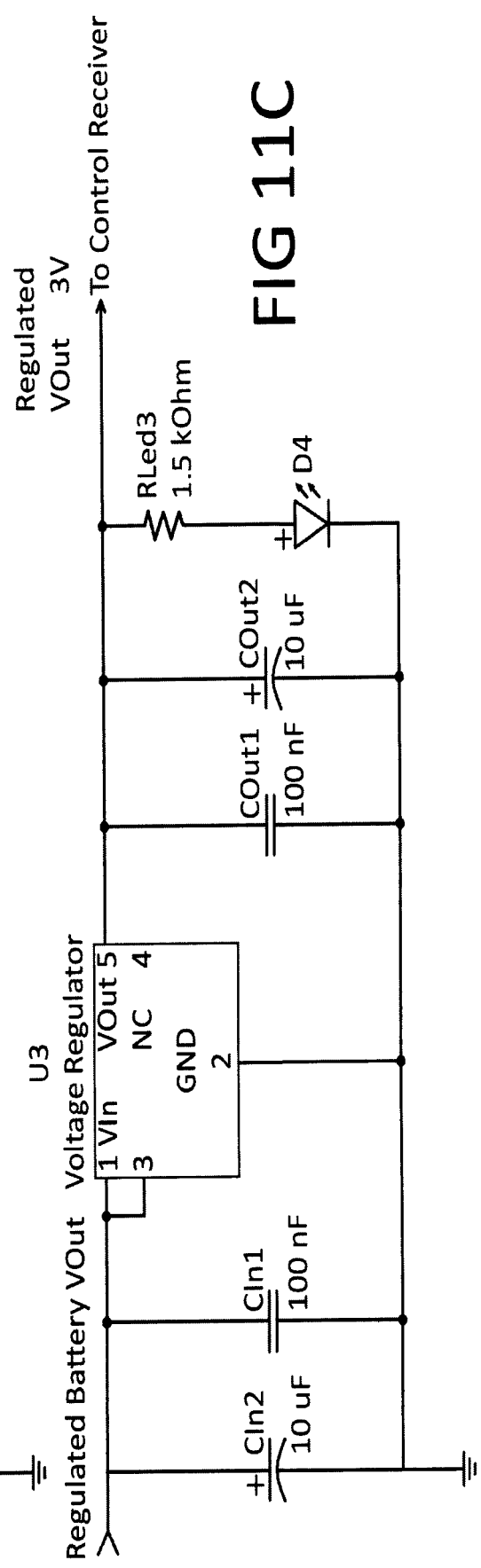
Figure 12:
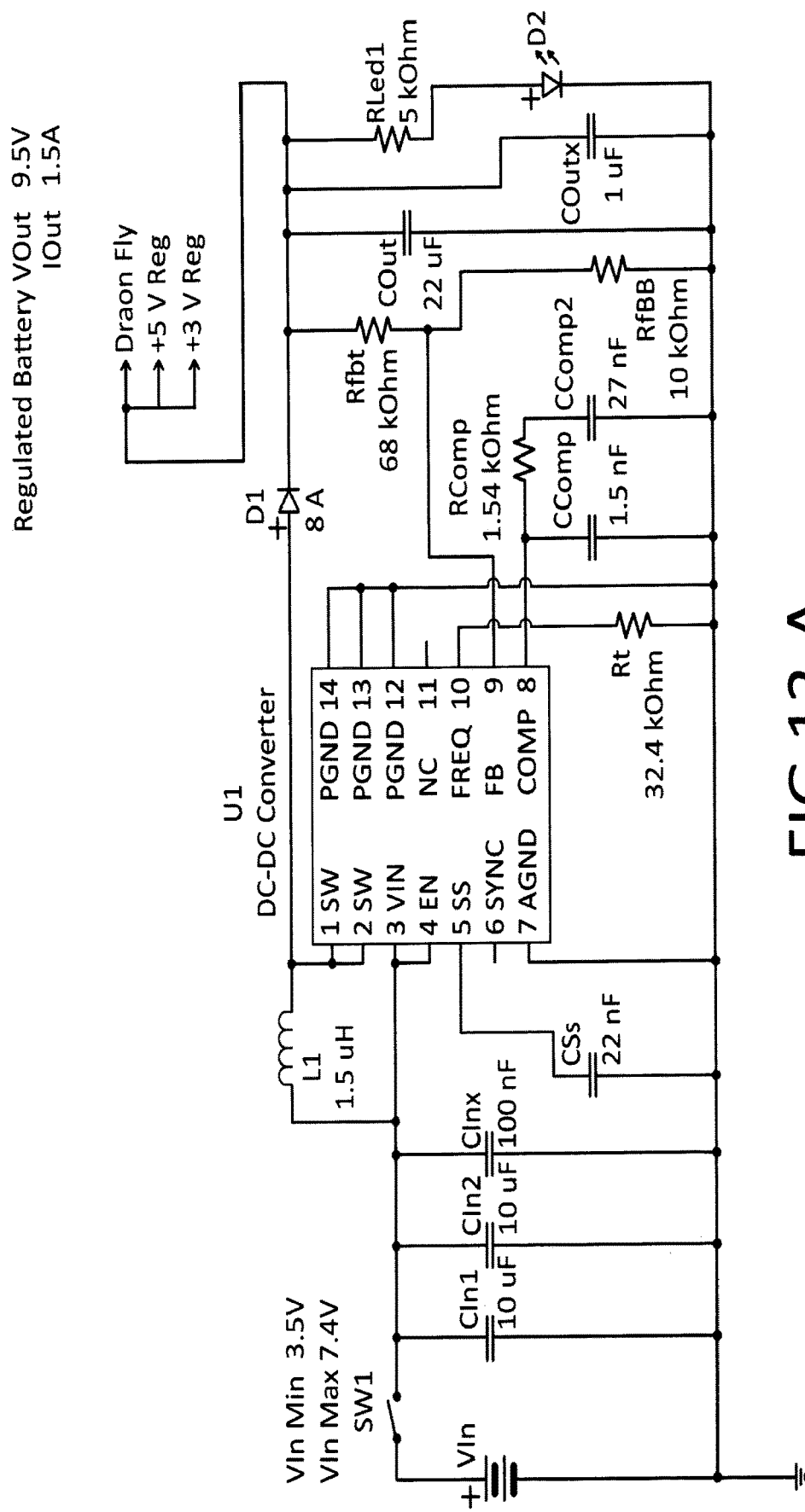
FIGS. 12A, 12B and 12C are block diagrams of the power supply circuit according to the present invention used with the remote control panel of FIG. 1.
Figure 12B:
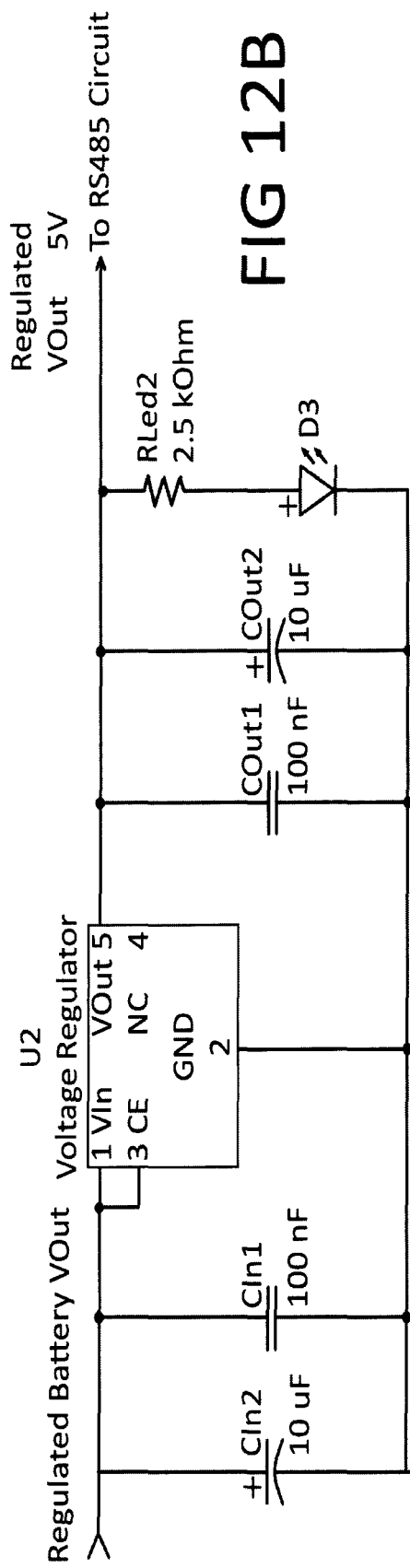
Figure 12C:
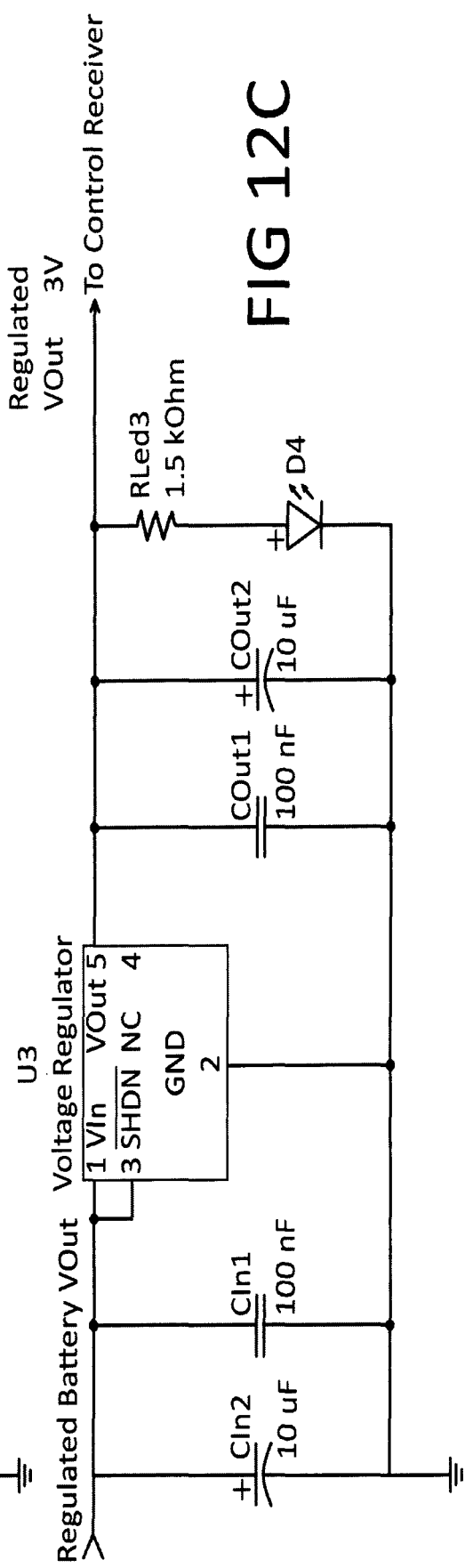
Figure 13:
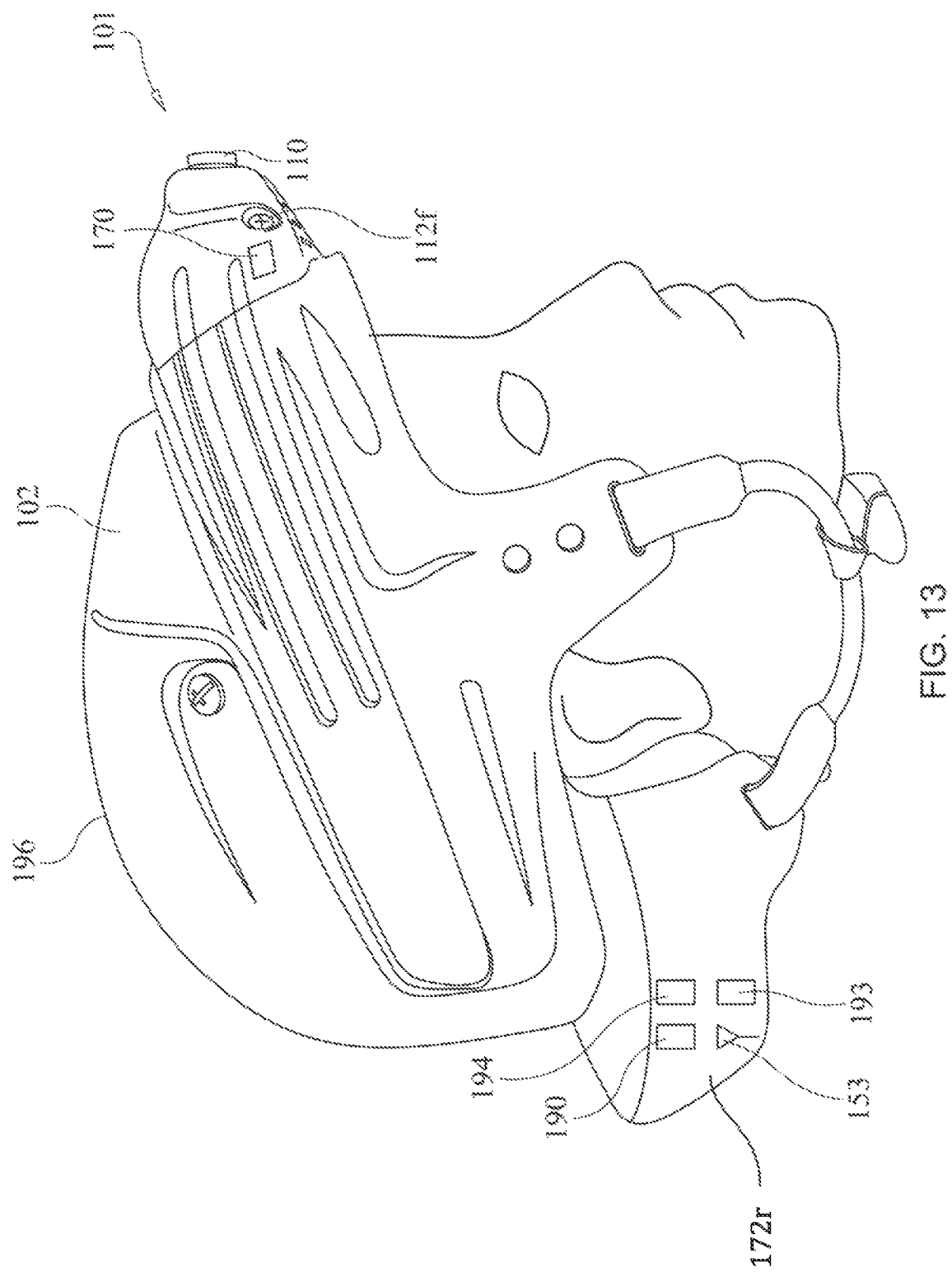
FIG. 13 is a side elevational view of the helmet and system for providing controls signals to a remote camera according to the present invention.
Figure 14:
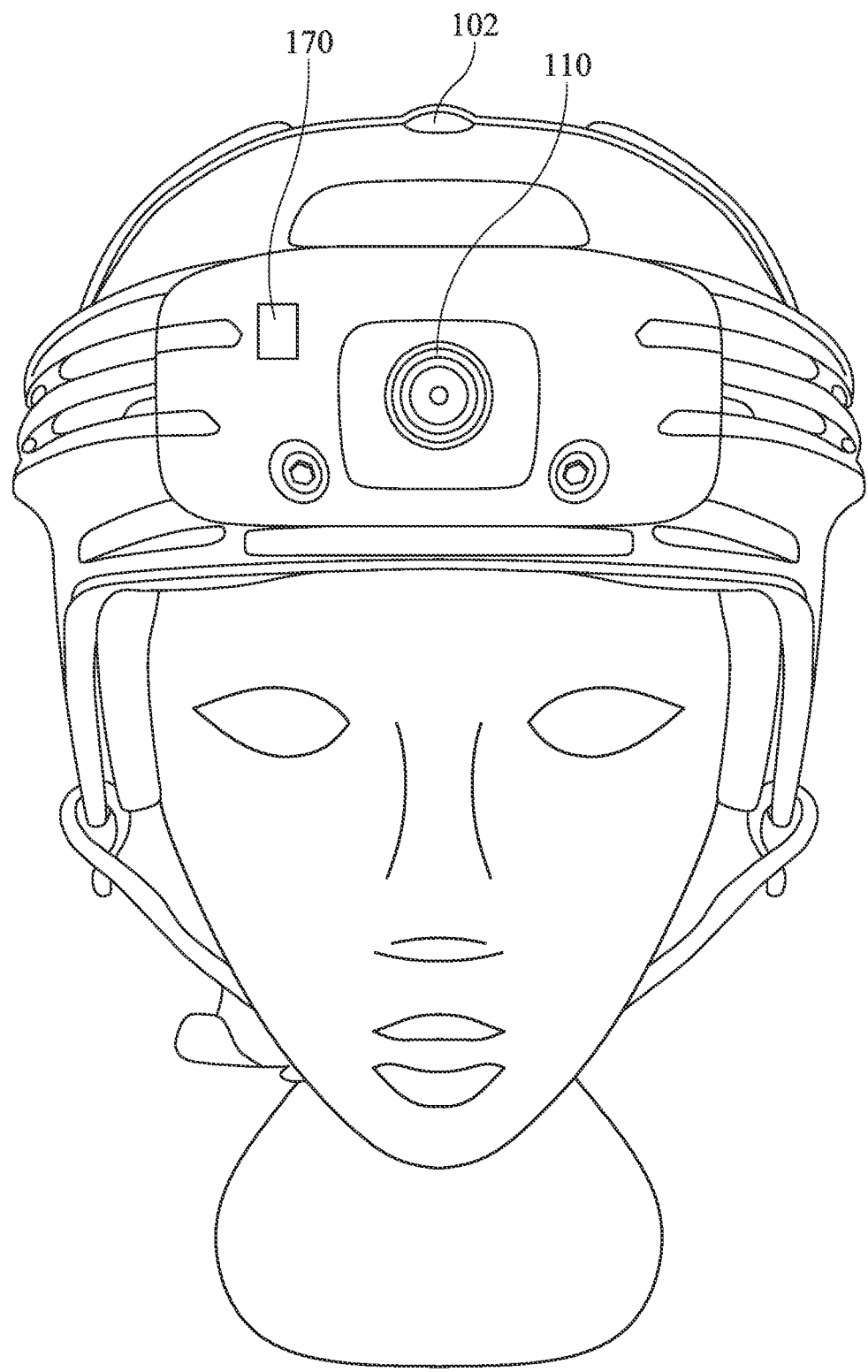
FIG. 14 is a front elevational view of the helmet and system of FIG. 13.
Figure 15:
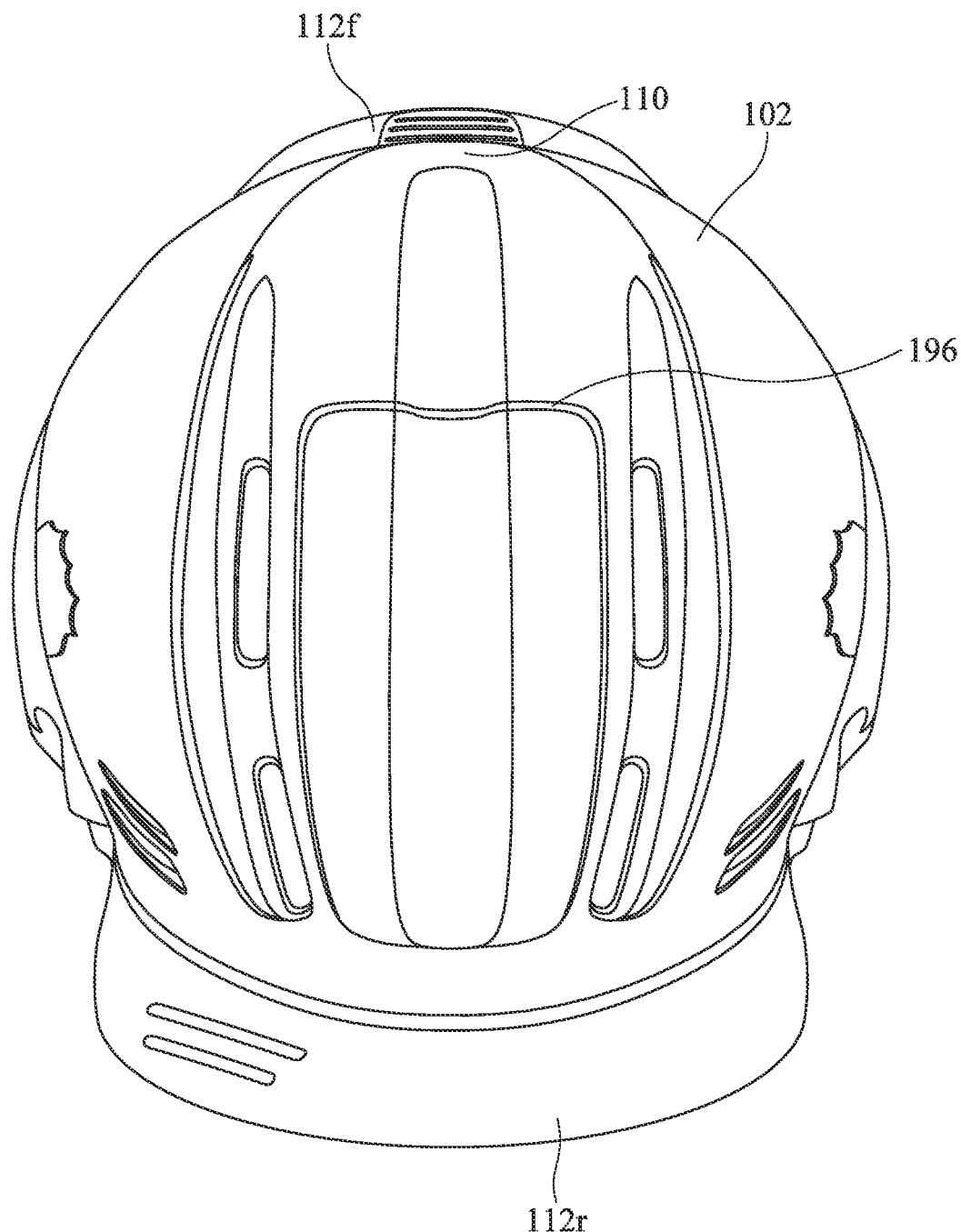
FIG. 15 is a top plan view of the helmet and system of FIG. 13.
Figure 16:
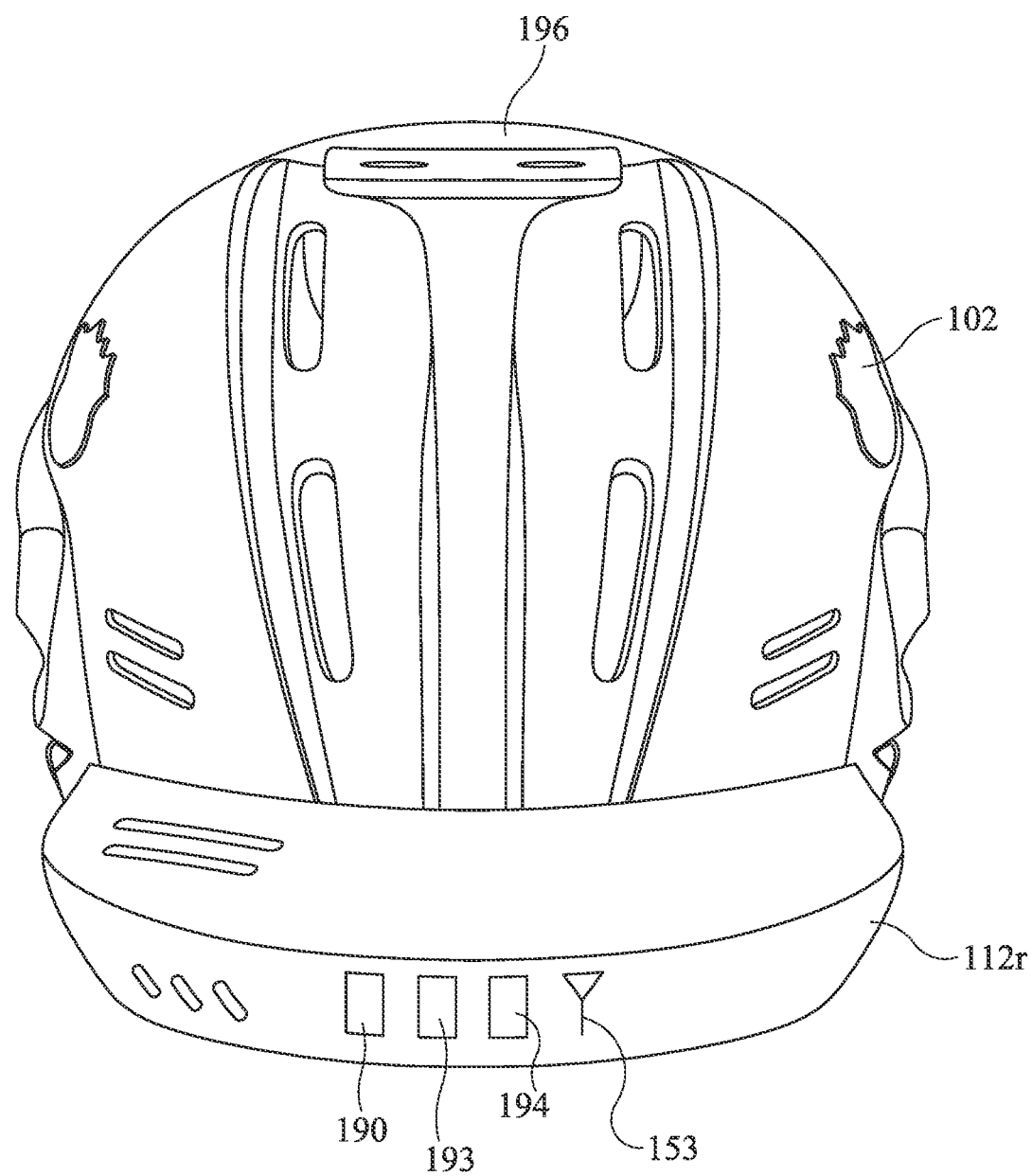
FIG. 16 is a rear elevational view of the helmet and system of FIG. 13.

Reference will now be made to FIG. 5 and FIG. 9, which show the circuit diagrams related to the first LT Series transceiver 130$t$ and the second LT Series transceiver 150$r$, respectively.

For the transmitter side, pin 8 of the LT Series transceivers 130$t$ must be pulled high to put the transceiver into transmit mode (see FIG. 5). The Data pin 7 becomes an input in this mode.

Pin 8 of the first LT Series transceiver 130t must be pulled low on the receiver side in order to put the transceiver into receive mode (see FIG. 9). The Data pin 7 becomes an output in this mode.

On each of the LT Series transceivers 130t, 150r, Pin 9, Power Down, must be pulled high to activate the transceiver (see FIGS. 5 and 9).

Pin 5, Analog Ref, determines the data slicer of the receiver 150r (see FIG. 9). This value was determined by practical experimentation to get the best signal to noise ratio. A 1 MOhm resistor 151 (see FIG. 9) to ground was found to be acceptable.

Pin 12, Power Level Adjust, determines the output power of the transceiver (see FIG. 5).

A 750 Ohm resistor to Vcc places the output power at 0 dBm (see FIGS. 5 and 9)

The Marshall™ RCP Remote Control Panel 120 has an RS-485 output that is operatively connected via the system for providing controls signals to a remote camera 100 to the RS-485 input of the Marshall™ Camera 110. The first Linx™ transceiver 130t and the second Linx™ transceiver 130t are functionally disposed inbetween the Marshall™ RCP Remote Control Panel 120 and the Marshall™ Camera 110. In the prior art, the Marshall™ RCP Remote Control Panel 120 and the Marshall™ Camera 110 are hard-wired together. Functionally interconnecting the Marshall™ RCP Remote Control Panel 120 and the Marshall™ Camera 110 provides unlimited freedom of movement for the wearer/user of the Marshall™ Camera 110 due to removal of a physical connection between the RCP Remote Control Panel 120 and the Marshall™ Camera 110.

In the illustrated embodiment according to the present invention, the RS-485 output must be converted to a single wire transmission in order to keep the RS-485 noise immunity properties and be able to inject the signal into the transmitter side of the transceiver on pin 7 and receive the data on the receiver side on pin 7. Then the data will be converted back to RS-485 to be injected into the Marshall™ camera 110 to control same.

A LTC1686 RS-485 Fail-Safe Transceiver 130t is operatively connected in signal-receiving relation to the RS-485 port of the Marshall™ RCP Remote Control Panel 120, as will be described in greater detail subsequently, and is also connected in signal-delivering relation to the first LT Series transceiver 140t. The transceiver 140t is also used for its short circuit protection and wide range of signal levels.

The Marshall™ RCP RS-485 pin 2 of the XLR (latching cylindrical connector) has a signal level from 0 to 3 volts positive going data signal. Pin 3 has a signal level from 3 to 0 volts negative going data signal.

A 100 Ohm termination resistor must be placed across the receiver pins of the transmitter RS-485 chip 130t and a 100 Ohm termination resistor must be placed across the driver pins of the receiver RS-485 chip 150r for impedance matching; thus the Marshall™ RCP 120 and Camera 110 are not affected by the wireless transceiver in the middle of the transmission path.

Since the Marshall™ RCP 120 has a low level for the RS-485, a 5-volt supply is used.

The Linx™ transceiver exhibits an unfavorable characteristic when in receive mode. When the data line is idle in a low state and no data is being received, the output of pin 7 drifts high in time. There is a wake-up time period of the receiver altering the data width, which produces unwanted bits on the leading packet of data confusing the Marshall™ camera. To overcome this problem the input to the RS-485 chip 130t on the transmission side is reversed to produce a high idle state, thus keeping the receiver from going to sleep, which is necessary for proper ongoing data communication.

Surprisingly, it was found that reversing the RS-485 input of the second transceiver 150r (the receiver) with respect to the RS-485 output of the first transceiver 130t (the transmitter) negates the polarity change at the transmissions side, so as to cause the Marshall™ camera to operate correctly. As a result, it was realized that the first transceiver 130t and the second transceiver 150r could be used for transmission of controls signals from the Marshall™ RCP Remote Control Panel 120 and the video camera 110.

Since the Linx™ transceiver (130t, 150r) operates at 3 volts and the RS-485 chip operates at 5 volts, due to the data line's requirements, two voltage regulators need to be installed in the receive and transmit sections.

As weight placed on the helmet 102 is to be minimized, a two-cell battery pack was chosen. This pack is lithium 7.4 volt 5400 mAh. The minimum input voltage of the Video transmitter is 7.5 volts. A shut down state of the Video transmitter is 6.8 Volts. It has a working range of 0.6 Volts. To improve the working range of the system, a DC to DC Boost convertor 192 is implemented as part of the power supply 190.

For the Receive section:
The ideal parameters were selected as:
Vin Minimum 3.5 volts
Vin Maximum 7.4 volts
Vout 9.5 volts
Iout 1.5 amps This gives a working range of 3.9 volts (Vin Maximum 7.4 volts minus Vin Minimum 3.5 volts)

For the Transmission section:
The ideal parameters were selected as:
Vin Minimum 3.5 volts
Vin Maximum 7.4 volts
Vout 8 volts
Iout 0.5 amps This gives a working range of 3.9 volts (Vin Maximum 7.4 volts minus Vin Minimum 3.5 volts).

The TPS55340 is selected for the Receive section and the LM2700 is selected for the transmit section.

Using the Webench™ application from Texas Instruments, a design was created to meet the parameters of the Receive section. The first attempt was not successful in delivering the output current needed.

Alterations to the design achieved the required performance. The convertor chip was changed from a TPS55340Q1 to a TPS55340PBP. As a result these components had to change to:
Cin3 10 uf
L1 3.3 uH
RT 61.9 kOhms
Ccomp 3.9 of
Rcomp 1.27 kOhms
Ccomp2 68 nf Using the Webench™ application from Texas Instruments a design was created to meet the parameters of the Transmitter section.

By utilizing a conventional remote control panel RCP 120, which was developed and is used for a wired configuration, in the present invention, the board level camera 110 can now be accurately controlled wirelessly, through radio frequency (RF) transmission, in real-time without interrupting productions use of this camera resource and put this control point in the hands of the video engineer working within the broadcast control facility. This also allows for greater control of the camera image settings well beyond those available in the on-screen menu that is used in the prior art with Marshall™ wireless cameras.

a. To accomplish this, the applicant had to develop a solution to take the RCP protocol, transported in RS485 and converted this two-wire communication to a wireless transport. (See FIG. 5)
b. The wireless signal is then received via a transceiver embedded within the Incite™ camera package. This communication is converted back to RS485 then delivered to the board level camera to supply the camera data protocol. (See FIG. 7)
  i. The first challenge to overcome was finding a form of wireless transmission that did not affect the RCP data portal in a negative way. This was accomplished by choosing a transparent form of RF transmission. To do this a Linx™ LT series transceiver was selected. A KHC series receiver and transmitter were tried first; however, this was found to not be ideal because it did not work with the RCP protocol.
  ii. At this point, an LT evaluation series kit was used to learn the characteristics of the LT series transceiver. By utilizing this kit, the correct configuration of this transceiver determined and expanded on it to accept the RS485 transport protocol from the RCP. A wired transceiver was integrated to convert the RS485 to a conventional single wire connection. Adjustments had to be made within the receive portion to lower the sensitivity, this allowed the data received to be more reliable and not effected negatively by the noise floor. This allows us to separate our signal from unwanted signals that should not be monitored and may be misinterpreted as data. (See FIG. 5)
  iii. A visual polarity monitoring indicator was integrated into the transmitter to monitor the polarity from the RCP connection to the transmitter. This allows us to verify that our polarity is correct when deployed. This is a key trouble shooting tool when deploying the InCite™ Camera package. An LED light on the transmit module will indicate the following:
     LED Solid ON=Polarity Correct
     LED ON with flashes to black in sequence with data=Polarity Correct with data stream
     LED Solid OFF=Polarity Reversed
     LED Off with flashes of light in sequence with data=Polarity Correct but receiving data stream.
  iv. The InCite™ data transceiver, in receive mode within the remote camera package, had to have a wired transceiver integrated to allow conversion of the single data wire to RS485. This allowed the RS485 transport protocol to be delivered to the board level camera. (See FIG. 7)
  v. A receive antenna matching the TX frequencies was developed in order to fit the tight confines of the InCite™ component housing. This took a great deal of shaping and testing to optimize fit and frequency ranges. (See FIG. 7)
  vi. The RF data transmit module that is connect to the RCP; required a DC to DC converter as well as two voltage regulators. The DC to DC converter allows full utilization of the battery power within the module. The two voltage regulators, which are being fed by the DC to DC converter, supply the required voltages to the wired transceiver and the wireless transceiver. As a result of the optimization of the power the run time of the unit is significantly increased. (See FIGS. 8A, 8B and 8C)
  vii. The wireless InCite™ Camera RX module that receives the data and delivers it to the camera required a DC to DC converter as well as two voltage regulators. The DC to DC converter allows full utilization of the battery power within the module. The two voltage regulators, which are being fed by the DC to DC converter, supply the required voltages to the wired transceiver and the wireless transceiver. The DC to DC converter in this module also supplies efficient power to the Dragonfly™ transmitter to optimize battery power. As a result of the optimization of the power the run time of the unit is significantly increased. (See FIGS. 9A, 9B and 9C)
  viii. DC to DC converters had to be evaluated to find the appropriate match to our InCite™ Camera package. After determining workable DC to DC converters, the configuration had to be field tested. Subsequently modifications had to be made in order to obtain our input range voltage, as well as continuous output voltage and current. (See FIGS. 8A, 8B, 8C, 9A, 9B and 9C)

The Marshall™ RCP transmits defined data values for adjustments of image quality parameters such as iris control, blue levels, red levels, hue, saturation, and the like, instead of up/down increment commands. As a result of this, if there is missed data the next valid received data will produce an unwanted jump in the item controlled producing an unwanted effect on the cameras video. It is contemplated that a micro-processor could be programmed and used to track the commands and catch large jumps of data in order to provide a solution to this problem.

As can readily be seen, the present invention provides a novel system 100 for providing controls signals to a wireless remote camera. The system 100 comprises a signal generating device, specifically the remote control panel (RCP) 120, having a forward polarity output point 121 for presenting forward polarity pulse trains 124$f$ and an inverse polarity output point 122 for presenting inverse polarity pulse trains 124$i$ that are the inverse of the forward polarity pulse trains 124$f$. The pulse trains 124$f$, 124$i$ are compatible with a pre-defined electronic data transmission standard, such as RS-485.

A transmitter data converter circuit 140$t$, which in the illustrated embodiment comprises a data converter chip and more specifically a transceiver chip, is configured to convert the data trains 124$f$, 124$i$ to transistor-transistor logic (TTL) output. The transmitter data converter circuit 140$t$ has a forward polarity input point 142$f$ for receiving the inverse polarity pulse trains 124$i$ and an inverse polarity input point 142$i$ for receiving the forward polarity pulse trains 124$f$. The transmitter data converter circuit 140$t$ also has circuitry 144 for converting the forward polarity pulse trains 124$f$ and the inverse polarity pulse trains 124$i$ to a conditioned unitary pulse train 125, and a single point output 146 for presenting the conditioned unitary pulse train 125.

A modulator circuit 130$m$, which is part of the first Linx™ LT Series transceiver 130$t$, has an input 132 for receiving the conditioned unitary pulse train 125, circuitry 134 for modulating the conditioned unitary pulse train 125 onto a radio frequency (RF) carrier to thereby produce a modulated output wave 136, for transmitting the modulated output wave 136 from transmission antenna 139.

A demodulator circuit 150$d$, which is part of the second Linx™ LT Series transceiver 150$r$, has a radio frequency (RF) input 152 for receiving the modulated output wave 138 through antenna 153, circuitry 154 for demodulating the modulated output wave 136 to thereby produce a reproduction of the conditioned unitary pulse train 155, and an output 156 for presenting the reproduction of the conditioned unitary pulse train 155.

The first Linx™ LT Series transceiver 130t and the transmitter data converter circuit 140t are powered by a power supply 128.

A receiver data converter circuit 160r, which in the illustrated embodiment comprises a data converter chip and more specifically a transceiver chip, is configured to convert transistor-transistor logic (TTL) input to the data trains, has a single point input 162 for receiving the conditioned unitary pulse train 155, circuitry 164 for converting the conditioned unitary pulse train 155 to conditioned forward polarity pulse trains 165f and conditioned inverse polarity pulse trains 165i that are the inverse of the conditioned forward polarity pulse trains 165f, and a forward polarity output point 168f for presenting the conditioned inverse polarity pulse trains 165i and an inverse polarity output point 168i for presenting the forward polarity pulse trains 165f.

A camera control circuit 170 has an input port 172 comprising a forward polarity input point 172f for receiving the conditioned forward polarity pulse trains 165f from the inverse polarity input point 168i of the receiver data converter circuit 160r and an inverse polarity input point 172i for receiving the conditioned inverse polarity pulse trains 165i from the forward polarity input point 168f of the receiver data converter circuit 160r. There is also circuitry 174 for producing control signals 176 based on the conditioned forward polarity pulse trains 165f and the conditioned inverse polarity pulse trains 165i.

The wireless camera 110 is connected in signal receiving to the camera control circuit 170 for receiving control signals 176 therefrom.

The present invention also provides novel circuitry for providing the controls signals 176 to the remote camera 110. The novel circuitry comprises the transmitter data converter circuit 140t, the modulator circuit 130m, the demodulator circuit 150d, the receiver data converter circuit 160r, and the camera control circuit 170, as described above.

The present invention also provides novel method of providing controls signals 176 to the wireless remote camera 110. The method comprises the steps of a) producing forward polarity pulse trains 124f and inverse polarity pulse trains 124i that are the inverse of the forward polarity pulse trains 124f, and that are each compatible with a pre-defined electronic data transmission standard; b) presenting the forward polarity pulse trains 124f from a forward polarity output point 121 and the inverse polarity pulse trains 124i from an inverse polarity output point 122; c) receiving the inverse polarity pulse trains 124i into a forward polarity input point 142f of a transmitter data converter circuit and the forward polarity pulse trains 124f into an inverse polarity input point of the transmitter data converter circuit; d) converting the forward polarity pulse trains 124f and the inverse polarity pulse trains 124i to a conditioned unitary pulse train 125; e) modulating the conditioned unitary pulse train 125 onto a radio frequency (RF) carrier to thereby produce a modulated output wave 136; f) demodulating the modulated output wave 136 to thereby produce a reproduction of the conditioned unitary pulse train 155; g) converting the reproduction of the conditioned unitary pulse train 155 to conditioned forward polarity pulse trains 165f and conditioned inverse polarity pulse trains 165i that are the inverse of the conditioned forward polarity pulse trains 165f; h) presenting the inverse polarity pulse trains 165i at a forward polarity output point 168f and the forward polarity pulse trains 165f at an inverse polarity input point 168i; i) receiving the conditioned forward polarity pulse trains 165f into a forward polarity input point 172f of a camera control circuit 170 and the conditioned inverse polarity pulse trains 165i into a inverse polarity input point 172i of the camera control circuit 170; and j) producing control signals 176 based on the conditioned forward polarity pulse trains 165f and the conditioned inverse polarity pulse trains 165i for use in controlling the camera 110.

The present invention provides a novel helmet and wireless camera and circuit assembly 101, as can be best seen in FIGS. 13 through 16, and comprising the helmet 102, a forward holder 112f mounted on the forward area of the helmet 102 and a rearward holder 112r mounted on the rearward area of the helmet 102. The camera 110 is mounted on the forward holder 112f. A camera control circuit 170 is mounted on the forward holder 112f. A power supply 190 is mounted on the rearward holder 112r. A battery 194 is mounted on the rearward holder 112r. A data-receiving antenna 153 is mounted on the rearward holder 112r. A power distribution circuit board 193, which is part of the power supply 190, houses the DC to DC Boost convertor 192 and is mounted on the rearward holder 112r. A video transmission antenna 196, which is preferably a microwave type antenna, is mounted on the helmet 102 in between the forward holder 112f and the rearward holder 112r.

The present invention provides a novel wireless camera and circuit assembly comprising the forward holder 112f and the rearward holder 112r, as described above, and also the camera 110, the camera control circuit 170, the power supply circuit 190, the battery 194, the data-receiving antenna 153, and the power distribution circuit 159.

Components List & Sources

Wireless Video Camera 110 and Remote Control Panel (RCP) 120
  both from Marshall Electronics, Inc., 20608 Madrona Avenue, Torrance, Calif. 90503 USA
Dragonfly™ Transmitter 180
  from Integrated Microwave Technologies, LLC, 200 International Drive, Mount Olive, N.J. 07828 USA
DC-DC converters
TPS 55340 Boost Converter (in the receiver)
LM 2700 Boost Converter (in the transmitter)
  both from Texas Instruments, Dallas, Tex. 75243 USA Other variations are within the spirit of the present invention. Thus, while the invention is susceptible to various modifications and alternative constructions without departing from the spirit of the inventions disclosed and claimed, only a limited number of embodiments or variations thereof have been illustrated or otherwise disclosed herein by way of non-limiting example. It should be understood, however, that there is no intention to limit the invention to the specific form or forms disclosed, but on the contrary, the intention is to cover all modifications, alternative constructions, and equivalents falling within the spirit and scope of the invention, as defined in the appended claims broadly construed.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of any and all examples, or exemplary language (e.g., "such as", or, "for example") provided herein, is intended merely to better illuminate embodiments of the invention and does not pose a limitation on the scope of the invention unless otherwise claimed. No language in the specification should be construed as indicating any non-claimed element as essential to the practice of the invention.

Currently preferred embodiments of this invention are described herein. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A system for providing control signals to a wireless remote camera, said system comprising:
    a signal generating device having a forward polarity output point for presenting forward polarity pulse trains and an inverse polarity output point for presenting inverse polarity pulse trains that are the inverse of said forward polarity pulse trains, wherein said pulse trains are compatible with a pre-defined electronic data transmission standard;
    a transmitter data converter circuit having a forward polarity input point for receiving said inverse polarity pulse trains and an inverse polarity input point for receiving said forward polarity pulse trains, and having circuitry for converting said forward polarity pulse trains and said inverse polarity pulse trains to a conditioned unitary pulse train, and a single point output for presenting said conditioned unitary pulse train;
    a modulator circuit having an input for receiving said conditioned unitary pulse train, circuitry for modulating said conditioned unitary pulse train onto a radio frequency (RF) carrier to thereby produce a modulated output wave, and a radio frequency (RE) output for transmitting the modulated output wave;
    a demodulator circuit having a radio frequency (RF) input for receiving said modulated output wave, circuitry for demodulating said modulated output wave to thereby produce a reproduction of said conditioned unitary pulse train, and an output for presenting said reproduction of said conditioned unitary pulse train;
    a receiver data converter circuit having a single point output for receiving said conditioned unitary pulse train, circuitry for converting said conditioned unitary pulse train to conditioned forward polarity pulse trains and conditioned inverse polarity pulse trains that are the inverse of said conditioned forward polarity pulse trains, and a forward polarity input point for presenting said inverse polarity pulse trains and an inverse polarity input point for presenting said forward polarity pulse trains;
    a camera control circuit having an input port comprising a forward polarity input point for receiving said conditioned forward polarity pulse trains from said inverse polarity input point of said receiver data converter circuit and an inverse polarity input point for receiving said conditioned inverse polarity pulse trains from said forward polarity input point of said receiver data converter circuit, and circuitry for producing control signals based on said conditioned forward polarity pulse trains and said conditioned inverse polarity pulse trains; and,
    a camera connected in signal receiving to said camera control circuit for receiving control signals therefrom.

2. The system according to claim 1, wherein said pre-defined electronic data transmission standard is RS485.

3. The system according to claim 1, wherein said transmitter data converter circuit and said receiver data converter circuit each comprise a data converter chip.

4. The system according to claim 3, wherein said transmitter data converter circuit and said receiver data converter circuit each comprise a transceiver chip.

5. The system according to claim 4, wherein said transmitter data converter circuit and said receiver data converter circuit each comprise an LTC1686 RS-485 Fail-Safe Transceiver chip.

6. The system according to claim 1, wherein said transmitter data converter circuit is configured to convert said data trains to transistor-transistor logic (TTL) output and said receiver data converter circuit is configured to convert transistor-transistor logic (TTL) input to said data trains.

7. The system according to claim 1, wherein said signal generating device comprises a remote control panel model CV-RCP-V2 Multi-Camera Control Touchscreen.

8. Circuitry for providing controls signals to a wireless remote camera, said circuitry comprising:
    a transmitter data converter circuit having a forward polarity input point for receiving inverse polarity pulse trains and an inverse polarity input point for receiving forward polarity pulse trains, and having circuitry for converting said forward polarity pulse trains and said inverse polarity pulse trains to a conditioned unitary pulse train, and a single point output for presenting said conditioned unitary pulse train;
    a modulator circuit having an input for receiving said conditioned unitary pulse train, circuitry for modulating said conditioned unitary pulse train onto a radio frequency (RF) carrier to thereby produce a modulated output wave, and a radio frequency (RF) output for transmitting the modulated output wave;
    a demodulator circuit having a radio frequency (RF) input for receiving said modulated output wave, circuitry for demodulating said modulated output wave to thereby produce a reproduction of said conditioned unitary pulse train, and an output for presenting said reproduction of said conditioned unitary pulse train;
    a receiver data converter circuit having a single point output for receiving said conditioned unitary pulse train, circuitry for converting said conditioned unitary pulse train to conditioned forward polarity pulse trains and conditioned inverse polarity pulse trains that are the inverse of said conditioned forward polarity pulse trains, and a forward polarity input point for presenting said inverse polarity pulse trains and an inverse polarity input point for presenting said forward polarity pulse trains; and,
    a camera control circuit having an input port comprising a forward polarity input point for receiving said conditioned forward polarity pulse trains from said inverse polarity input point of said receiver data converter circuit and an inverse polarity input point for receiving said conditioned inverse polarity pulse trains from said forward polarity input point of said receiver data converter circuit, and circuitry for producing control signals based on said conditioned forward polarity pulse trains and said conditioned inverse polarity pulse trains.

9. The circuitry according to claim 8, wherein said pre-defined electronic data transmission standard is RS485.

10. The circuitry according to claim 8, wherein said transmitter data converter circuit and said receiver data converter circuit each comprise a data converter chip.

11. The circuitry according to claim 8, wherein said transmitter data converter circuit and said receiver data converter circuit each comprise a transceiver chip.

12. The circuitry according to claim 11, wherein said transmitter data converter circuit and said receiver data converter circuit each comprise an LTC1686 RS-485 Fail-Safe Transceiver chip.

13. The circuitry according to claim 8, wherein said transmitter data converter circuit is configured to convert said data trains to transistor-transistor logic (TTL) output and said receiver data converter circuit is configured to convert transistor-transistor logic (TTL) input to said data trains.

14. The circuitry according to claim 8, wherein said signal generating device comprises a remote control panel model CV-RCP-V2 Multi-Camera Control Touchscreen.

15. A method of providing controls signals to a wireless remote camera, said method comprising the steps of:
a) producing forward polarity pulse trains and inverse polarity pulse trains that are the inverse of said forward polarity pulse trains, and that are each compatible with a pre-defined electronic data transmission standard;
b) presenting said forward polarity pulse trains from a forward polarity output point and said inverse polarity pulse trains from an inverse polarity output point;
c) receiving said inverse polarity pulse trains into a forward polarity input point of a transmitter data converter circuit and said forward polarity pulse trains into an inverse polarity input point of said transmitter data converter circuit;
d) converting said forward polarity pulse trains and said inverse polarity pulse trains to a conditioned unitary pulse train;
e) modulating said conditioned unitary pulse train onto a radio frequency (RF) carrier to thereby produce a modulated output wave;
f) demodulating said modulated output wave to thereby produce a reproduction of said conditioned unitary pulse train;
g) converting said reproduction of said conditioned unitary pulse train to conditioned forward polarity pulse trains and conditioned inverse polarity pulse trains that are the inverse of said conditioned forward polarity pulse trains;
h) presenting said inverse polarity pulse trains at a forward polarity output point and said forward polarity pulse trains at an inverse polarity output point;
i) receiving said conditioned forward polarity pulse trains into a forward polarity input point of a camera control circuit and said conditioned inverse polarity pulse trains into a inverse polarity input point of said camera control circuit; and,
j) producing control signals based on said conditioned forward polarity pulse trains and said conditioned inverse polarity pulse trains for use in controlling a camera.

16. The method according to claim 15, wherein said pre-defined electronic data transmission standard is RS485.

17. The method according to claim 15, wherein, in steps c) and d), said data trains are converted to transistor-transistor logic (TTL) output and in steps g) and h), transistor-transistor logic (TTL) input is converted to said data trains.

* * * * *